US012473739B2

(12) United States Patent
Paz Pascual et al.

(10) Patent No.: US 12,473,739 B2
(45) Date of Patent: Nov. 18, 2025

(54) SYSTEM FOR REVERSIBLY CONVERTING STADIUMS INTO MULTIFUNCTIONAL INFRASTRUCTURE

(71) Applicant: Sener Mobility, S.A., Vizcaya (ES)

(72) Inventors: Juan Francisco Paz Pascual, Getxo-Vizcaya (ES); Jesus Maria Lata Perez, Getxo-Vizcaya (ES); Xavier Lekube Insausti, Getxo-Vizcaya (ES); Jorge Vizcaya Perez, Getxo-Vizcaya (ES); Miguel Angel Morales, Getxo-Vizcaya (ES)

(73) Assignee: SENER MOBILITY, S.A., Vizcaya (ES)

( * ) Notice: Subject to any disclaimer, the term of this patent is extended or adjusted under 35 U.S.C. 154(b) by 273 days.

(21) Appl. No.: 17/906,689

(22) PCT Filed: Mar. 18, 2021

(86) PCT No.: PCT/ES2021/070198
§ 371 (c)(1),
(2) Date: Sep. 19, 2022

(87) PCT Pub. No.: WO2021/186096
PCT Pub. Date: Sep. 23, 2021

(65) Prior Publication Data
US 2023/0175277 A1   Jun. 8, 2023

(30) Foreign Application Priority Data
Mar. 19, 2020   (ES) .................................. 202030231

(51) Int. Cl.
E04H 3/14   (2006.01)
E04H 3/12   (2006.01)
E01C 13/00  (2006.01)

(52) U.S. Cl.
CPC ............... *E04H 3/14* (2013.01); *E04H 3/126* (2013.01); *E01C 2013/006* (2013.01); *E04H 2003/142* (2013.01)

(58) Field of Classification Search
CPC ..... E01C 2013/006; E04H 3/10; E04H 3/126; E04H 3/14; E04H 2003/142; A63C 19/02; A63C 19/12; E04B 1/34321
(Continued)

(56) References Cited

U.S. PATENT DOCUMENTS 3,001,243 A * 9/1961 Conn ...................... E04H 3/126
                                                          52/10
3,168,761 A * 2/1965 Graf .......................... E04H 3/22
                                                           52/9

(Continued)

FOREIGN PATENT DOCUMENTS

JP   H0782916 A      3/1995
JP   2961406 B2 * 10/1999
(Continued)

OTHER PUBLICATIONS

International Search Report and Written Opinion for Corresponding International Application No. PCT/ES2021/070198 (14 Pages) (Jun. 29, 2021).

*Primary Examiner* — James M Ference
(74) *Attorney, Agent, or Firm* — LUCAS & MERCANTI, LLP

(57) ABSTRACT

A system for reversibly converting stadiums into multifunctional infrastructure by removing the pitch and storing it in a pit (6), the pitch having a set of trays (1) having a total length equal to the pitch in a longitudinal direction of the pit, which are moveable, self-supporting and have layers of soil, irrigation and turf; a set of transport trolleys (2) for lifting and moving each tray (1) from its position on the pitch to the pit (6); a set of retractable trellises (5) that can be unfolded (Continued)

on the pit (6), for the entry of each tray (1) from above the pit; an elevator system (8) inside the pit (6) to move each tray to its final position, in storage, or on the pitch; and a storage system (7) for storing each tray in a fixed and stable position.

23 Claims, 50 Drawing Sheets

(58) Field of Classification Search
USPC ............................................................. 52/6
See application file for complete search history.

(56) References Cited

U.S. PATENT DOCUMENTS

| | | | | | |
|---|---|---|---|---|---|
| 3,399,887 | A | * | 9/1968 | Altier | A63J 1/00 472/75 |
| 3,975,869 | A | * | 8/1976 | Bouton | E04H 3/12 52/9 |
| 4,164,047 | A | * | 8/1979 | Barothy | E04H 4/084 52/39 |
| 4,497,154 | A | * | 2/1985 | Johnson | E04H 3/10 52/6 |
| 4,909,000 | A | * | 3/1990 | Mackintosh | E04H 3/126 52/9 |
| 4,937,896 | A | * | 7/1990 | Niimura | E04H 4/065 52/126.5 |
| 5,103,600 | A | * | 4/1992 | Geiger | E04H 3/14 52/126.5 |
| 5,187,894 | A | * | 2/1993 | Ripley, Sr. | E04H 3/14 52/6 |
| 5,309,846 | A | * | 5/1994 | Peterson | E01C 13/083 47/1.01 R |
| 5,319,895 | A | * | 6/1994 | Ray | E04H 3/26 52/126.5 |
| 5,365,704 | A | * | 11/1994 | Ray | E04H 3/26 52/6 |
| 5,379,556 | A | * | 1/1995 | MacIntyre | E04H 3/126 52/9 |
| 5,468,190 | A | * | 11/1995 | McCaffrey | E04H 3/26 52/126.5 |
| 5,682,711 | A | * | 11/1997 | Warczak | E04H 3/14 52/6 |
| 5,746,028 | A | * | 5/1998 | DiBenedetto | E01C 13/083 52/480 |
| 5,794,383 | A | * | 8/1998 | Labinski | E04H 3/12 52/9 |
| 5,921,032 | A | * | 7/1999 | Labinski | E04H 3/12 52/9 |
| 5,927,022 | A | * | 7/1999 | Hirakawa | E01C 13/083 52/6 |
| 5,974,743 | A | * | 11/1999 | Vaia | E04B 1/34363 52/169.1 |
| 6,168,532 | B1 | * | 1/2001 | McCaffrey | E01C 13/083 52/6 |
| 6,202,356 | B1 | * | 3/2001 | Hock | E04B 1/34363 52/9 |
| 6,286,264 | B1 | * | 9/2001 | Peuler | F16C 33/102 52/6 |
| 6,370,825 | B1 | * | 4/2002 | Vollebregt | E01C 13/083 52/6 |
| 6,385,912 | B1 | * | 5/2002 | Wessel | E01C 13/08 52/6 |
| 6,698,141 | B2 | * | 3/2004 | Silberman | E04B 7/166 52/126.5 |
| 7,562,496 | B2 | * | 7/2009 | Zwiebach | E04B 9/00 52/72 |
| 7,967,691 | B2 | * | 6/2011 | van Remundt | E01C 13/083 472/117 |
| 9,120,004 | B2 | * | 9/2015 | Saltveit | A63C 19/02 |
| 9,278,276 | B2 | * | 3/2016 | Estopinal | A63C 19/00 |
| 9,624,682 | B2 | * | 4/2017 | Jamison | E04H 3/14 |
| 10,450,745 | B2 | * | 10/2019 | Hall | A63J 1/00 |
| 2002/0129561 | A1 | * | 9/2002 | Silberman | E04B 7/166 52/6 |
| 2003/0037490 | A1 | * | 2/2003 | Stark, III | E04H 3/10 52/6 |
| 2004/0177578 | A1 | * | 9/2004 | Casimaty | A01G 9/033 52/653.1 |
| 2008/0242434 | A1 | * | 10/2008 | Van Remundt | E01C 13/083 472/92 |
| 2014/0123566 | A1 | * | 5/2014 | Saltveit | A63C 19/12 52/6 |
| 2015/0354240 | A1 | * | 12/2015 | Saltveit | E04H 6/10 52/6 |
| 2016/0008700 | A1 | * | 1/2016 | Estopinal | A63C 19/00 472/92 |
| 2019/0234027 | A1 | * | 8/2019 | Saltveit | E01C 13/083 |
| 2023/0175277 | A1 | * | 6/2023 | Paz Pascual | E04H 3/126 52/6 |

FOREIGN PATENT DOCUMENTS

| | | |
|---|---|---|
| WO | 1994020706 A1 | 9/1994 |
| WO | 2013002649 A1 | 1/2013 |
| WO | 2014102321 A1 | 7/2014 |
| WO | 2015024985 A2 | 2/2015 |
| WO | 2018001955 A2 | 1/2018 |

\* cited by examiner

SYSTEM FOR REVERSIBLY CONVERTING STADIUMS INTO MULTIFUNCTIONAL INFRASTRUCTURE

CROSS-REFERENCE TO RELATED APPLICATIONS

This application is a 371 of PCT/ES2021/070198, filed Mar. 18, 2021, which claims the benefit of Spanish Patent Application No. P202030231, filed Mar. 19, 2020, each of which are incorporated herein by reference.

FIELD OF THE INVENTION

The present invention belongs to the technical field of architecture and its industrial infrastructures, and more specifically to stadiums for events generally, and sporting events in particular, that have already been built or are newly built, understood as premises which combine a large central space for sports games and other events with a large seating capacity for spectators, and with respect to which the invention relates to an assembly of systems and mechanisms for converting them into multifunctional infrastructures. This allows them to exponentially increase their business plan as they are able to continuously host virtually any event, ranging from fairs to other sporting events, conferences, concerts, etc., most of which are incompatible with the playing field comprising natural or artificial turf on which sports games are played, said games being in most cases the predominant event for which the stadium was conceived.

The invention specifically relates to the playing field being built by means of an assembly of transportable trays, which are withdrawn into a pit located inside the stadium, but preferably outside the perimeter of the actual playing field, and can be removed and put back into the original location for practicing sport by means of an assembly of systems and mechanisms object of the invention.

STATE OF THE ART BACKGROUND OF THE INVENTION

There are a number of technical approaches today for converting stadiums into multifunctional facilities, though it is true that most are focused on newly built stadiums, are extremely complex and expensive, are not focused on the care and maintenance of the turf in a controlled environment, and furthermore, for the most part, are not valid for stadiums that are already built and operating.

Patent document WO2018/001955A2 shows a method of providing sports turf fields by means of deploying and installing several rectangular turf modules which are brought together both in the longitudinal direction and in the transverse direction to form the playing field, with attention being paid on the details of the connecting joints between modules. WO2013/002649A1 relates to a modern football or soccer stadium having a fixed support base with an opening providing access to the warehouse storing the turf modules and lifting the movable modules through the opening. This opening is within the playing field and the modules are caused to be lifted up or lowered by means of a scissor system. Furthermore, WO1994/020706A1 describes a hydraulic system for the lifting and lowering of modules, but also located below the playing field.

In summary, different solutions have been established, some under patents, which aim to convert stadiums into multifunctional infrastructures, but they are all difficult and expensive to carry out, being based on modules and 90° joints that are not technically well-resolved and result in many functional and maintenance problems. These solutions have been proposed fundamentally for newly built stadiums, not already built stadiums, and least of all stadiums that are already operating, and generally, either the playing field is removed towards the other outer area or the solutions invade the playing field to remove it and store it by means of an assembly of modules that are stacked on one another, and they either do not allow caring for and treating the turf on them during storage, or they make it too expensive to do so. All these limitations have resulted in these innovations not being absolutely widespread and existing in only some stadiums around the world, said innovations having included from their initial design steps different specific systems allowing them to remove and replace the playing field, for the most part, limiting the configuration of the bleachers and almost always shifting the playing field beyond the limits of the stadium, making it impossible for them to be applied in already existing stadiums or in stadiums located in consolidated urban settings where there is no more space than that which is effectively occupied by the footprint of the building. Furthermore, they do not have a truly regular use given that the entire operation of removing and replacing the playing field usually made of natural turf is not cost-effective.

It is therefore desirable to provide a system of mechanisms which readily allows stadiums, even those that are already built, to be converted into multifunctional infrastructures, without further affecting them in their normal use for their original use, this being achieved by means of building the playing field from an assembly of transportable trays that are pushed together in only one direction and can be removed and stored in a pit located within the stadium, but preferably outside the perimeter of the playing field, for carrying out any other type of event, and are put back in their original location when needed, without any damage to the configuration of the bleachers or any harm to the conditions of the turf, whether natural or artificial, all by means of a system of mechanisms object of the invention.

DESCRIPTION OF THE INVENTION

The present invention resolves the problems existing in the state of the art by means of an assembly of structures and mechanisms that readily and quickly allow converting an already built stadium into a multifunctional infrastructure by means of the removal and storage of the playing field in an automated manner in a pit built preferably on one side thereof.

This invention is furthermore consistent with the construction and implementation thereof without affecting the normal use for which the stadium was originally designed, for example, for practicing football or soccer, using to that end several of the time windows available between seasons.

The invention is based on configuring the playing field by means of complete bands which, either in the longitudinal direction or in the transverse direction, make up the playing field by means of a number of such bands pushed together only in the perpendicular direction, being in the other direction of the total length of the playing field, and therefore without forming cross joints or 90° joints.

The pit, in which the playing field configured by means of trays forming the total length of the playing field in one of its directions is stored, will preferably be built on the side perpendicular to that direction and therefore also to the movement said trays will have to make for being stored and/or extracted. This is furthermore achieved without affecting the bleachers if there is enough space to that end, or minimally affecting the side bleacher involved, which will be rebuilt in that case as a folding bleacher, configured in sections, allowing access and the introduction/extraction of the trays into/out of the pit. The pit will have a length that is at least the total length of the trays completely configuring the length of the playing field in that direction.

The fact that the pit is built on one side of the playing field and does not invade or barely invades the same has a series of important advantages. First, all the trays can be identical since in use they will all be supported on solid ground and without any difference in support between any of them. Furthermore, the construction of the pit on one side, without taking up space on the playing field, allows the entire system object of this invention to be built without affecting the normal operation of sports competitions, in the case of stadiums in use, using for the implementation thereof the time windows existing between seasons. This would not be possible, even with another embodiment of the invention, if the pit had to considerably invade the playing field; in this case, a season may be affected by the construction of the pit and/or all of its systems.

In the present invention, there is not a large number of trays configuring the playing field. It is estimated to be between 5 and 8 if the trays are configured in the longitudinal direction of the playing field, each tray then being up to 144 m long by between 12 and 9 m wide, respectively. There are estimated to be between 8 and 14 trays if the trays are configured in transverse direction, in this case being up to about 70 m long by between 13 and 8 m wide, respectively.

Each of the trays is individually stored vertically in a pit built for such purpose, there being sufficient separation between them, such separation being greater if some type of treatment for the tray in the pit is required. For example, if the trays have natural turf and it requires agronomic treatment, that is, irrigation, lighting, cutting the grass, etc., in the pit by way of a greenhouse so as to always be in perfect conditions, a free vertical separation of about 2 m will be provided between trays to enable performing all those maintenance tasks. This would be consistent with having natural turf always removed, protected, treated, and perfectly cared for in the pit for taking it out only for practicing, sports generally, for which it is necessary. If, on contrast, the natural turf trays are usually in their final outer position and treated, maintained, etc., in such position, and are only removed and stored for holding in the stadium any other type of event different, the vertical separation between them in the pit may be quite a bit smaller, and accordingly the pit may be a considerably lower total vertical height.

Briefly, the main elements and mechanisms object of this invention for being able to convert a stadium into a multifunctional infrastructure by means of the removal and subsequent replacement of the playing field are disclosed below.

These main elements are trays configured in complete bands for forming the playing field and having all the structural elements, natural or artificial turf and field elements, etc., required to be equivalent to a field with natural or artificial turf, but installed in transportable self-supporting trays; an assembly of transport carriages for the hoisting and subsequent horizontal shifting of each tray from the position thereof on the playing field to the vertical position of the pit, or alternatively each tray has its own motorization for translational movement; an assembly of retractable lattice girders for the safe entry of each tray transported by means of carriages on the vertical of the pit; a lifting system which allows lowering each tray to its final storage position, or raising it up from same; a storage system installed in the pit for storing each tray in a fixed and stable position; a system of folding bleachers, if required, lifting the bleachers in sections to allow the trays to be introduced in the pit, and which are folded onto same, covering and closing it, for use of the stadium while holding any type of event, whether a sporting event or not; or simply a system of trap doors in the event that the pit can be built in the auxiliary area between the field and the bleacher, for covering and closing it.

Briefly, the sequence for removing and storing the playing field by means of the system object of this invention, in a preferred embodiment, is indicated below in a simplified manner.

If there is not sufficient space to build the pit on one side of the playing field without invading the existing bleachers, bleachers which can be folded and opened in sections will have been installed; the assembly of transport carriages will subsequently be moved from the storage position thereof until being located in a position below the first tray, and they will hoist it in a synchronized manner a small height sufficient for allowing the subsequent horizontal transport thereof; the carriages will horizontally transport the tray, in a synchronized manner, to the edge of the pit, and will cause it to be lowered until it is supported on the ground and allows releasing the carriages; the retractable lattice girders will subsequently extend over the pit and be anchored at the other end thereof, with the carriages above them; the carriages will go back to pick up the tray and will shift it in a synchronized manner over the vertical of the pit, being supported on the retractable lattice girders; the lifting system, designed so as not to invade the entire surface the tray occupies above the pit on its vertical path, will deploy an assembly of supports through which it will hoist in a synchronized manner the tray slightly above its position, for the purpose of releasing it from the transport carriages and from the retractable lattice girders on which they are supported; the lattice girders will then be removed, taking the carriages with them, enabling the lifting system to start the lowering of the tray, in a synchronized manner with load and position control, to its storage destination position; the storage system will deploy the assembly of supports associated with the corresponding tray in order to receive it, which will be fixed once the lifting system is lowered below same, thus being released and folding the supports thereof in order to be available for the rest of the trays; the sequence will be repeated for the next tray, which will ultimately be stored in a position above the previous one. This will occur successively until all the trays forming the playing field have been removed, leaving a cleared surface ready for holding any other type of event; lastly, the folding bleachers, should they exist, will be closed, covering the pit and with it all the trays that have been stored therein.

According to different embodiments of the invention, the transport carriages can be complete and integrated, or be subdivided into master and slave, mechanically linked to one another, to optimize the system. In this case, the master carriage would have the entire motorization while the slave carriage would have the tray joint closure mechanism. This preferred embodiment optimizes the functionality of each carriage, simplifies the design thereof, and facilitates the arrangement of the carriages for their most sensitive parts to be able to be located on the outer sides of the trays, with much better accessibility for any maintenance, repair, replacement, etc. The carriages, which are always autonomous, may be guided by means of rails or by means of an inductive guidance system.

In another embodiment of the invention, each tray will directly have its own motorization for translational movement thereof, such that transport carriages therein and the need for hoisting movement thereon are eliminated, and the trays may be structurally more robust and need less height by not requiring being able to introduce the carriages below them; conversely, many more motorizations, multiplied by the number of trays, will be required, and when they are extracted, forming the playing field, they will be directly supported on the guidance systems thereof and not on the support slab, with the need for additional side fixing means.

The retractable lattice girders will preferably be of a length that is twice the width of the pit in order to allow the rolling thereof to take place only on the support base, and they are furthermore counterweighted so that they can enter and exit the pit with absolute safety, without requiring double rolling. If there were any available space limitation for the lattice girders, in another embodiment of the invention they could be of a length that is approximately half of just a little more than the width of the pit. In this case, they would require double rolling to safely access the pit, and it would be necessary to implement a double guidance in the transport carriages, one when they move over the lattice girder, and another one when they move over the field slab so that they can move when the lattice girder is already deployed over the pit, and the carriages have to go back to pick up the tray. In any case, each retractable lattice girder will always be provided both with centering systems and with securing systems at both ends, to ensure and make the maneuvers thereof more reliable.

The two previous embodiments of the retractable lattice girders are focused on lattice girders being located on the field side and extending over the pit towards the bleacher side, all being consistent with the advantage of not affecting the bleachers or affecting them as little as possible, or, even where a side bleacher must be rebuilt, there are also space limitations below that bleacher for being able to take the installation of the lattice girders to the bleacher side, which may all be common in stadiums that are already built and therefore having conditioning configuration and space limitation factors. If all these limitations can be overcome, another embodiment of the invention is to build retractable lattice girders, whether they are of twice the length or an equivalent length with respect to the width of the pit, but on the bleacher side, which allows simplifying the system and the movements of the transport carriages, and eliminating the gaps to be made in the support slab for housing the lattice girders on the field side, as well as the double guidance in the transport carriages in the case of implementing the lattice girders having a smaller length.

The lifting system will be hydraulic in its preferred embodiment, based on reliably designed telescopic hydraulic cylinders and guided by means of a runner along the entire path thereof, said runner having a double wheel for two-way loading and with distribution equalizers. The lifting system, configured by means of an assembly of hydraulic cylinders which will be moved in a synchronized manner both under a load and in position, will be powered by several hydraulic sets, each of them with their pumps and motors. The design will be fail-safe both in pumps and motors by means of a common collector, and in start-up cabinets by means of a collector ring between the hydraulic sets.

In another embodiment of the invention, the lifting mechanism will be based on electromechanically actuated cables and pulleys.

In the pit, both the supports of the storage system and the supports of the lifting system will preferably present pneumatic actuation or alternatively electromechanical actuation. Furthermore, they will be based on supports which, in a preferred embodiment, are deployed and retracted by means of vertical movement rotating via horizontally arranged shafts, but also alternatively with lateral movement rotating by means of vertical shafts.

This entire system is conceived and designed to offer the advantage of having complete control over the agronomic conditions of the turf inside the pit, regardless of the weather, and allowing complete care for the turf like in a greenhouse, by providing it with all the necessary installations, that is, lighting, climate control, irrigation and drainage, chemical treatments, etc., all of which is intensively controlled by sensors and with complete accessibility to all trays with turf for the treatment thereof.

The entire system object of this invention has been configured so as to be inherently oriented towards being reliable, so that in an expedient and safe manner a stadium, even one that has already been built can be converted into a multifunctional infrastructure often and in a completely reversible manner, with complete execution reliability. To that end the entire assembly and all its subsystems will be modular, with rapid replacement interfaces, and provided with the necessary means, redundancies, etc., to assure a completely ensured convertibility.

Furthermore, it will be provided with an integrated control system, with many instruments, and a redundancy of critical sensors in all the subsystems, communications, central station, and data server.

Furthermore, the use of simple designs, with linear and uncoupled movements, of commercial and maintenance-free components, if possible, with high margins of safety and redundancies of critical elements, etc., simplifies the system and reduces its maintenance needs.

All the preceding advantages translate into a simple and reliable system for converting a stadium, even though it has already been built, into a multifunctional infrastructure, multiplying its capacity and versatility of use. It allows exponentially increasing its business plan as it can continuously host virtually any event, ranging from fairs to other sporting events, conferences, concerts, etc., in addition to the use for which it was initially conceived, for example, football or soccer matches.

BRIEF DESCRIPTION OF THE DRAWINGS

An embodiment of the invention will be described below in an illustrative, non-limiting manner in reference to a series of figures to facilitate understanding of the invention.

in FIG. 3 the corresponding transport carriage is located in a position below the tray; and in FIG. 4 it is hoisted in a synchronized manner with the rest of the transport carriages, ready to be transported to its position to make up the playing field.

FIGS. 41 to 43 show an alternative lifting system based on cables and winches. FIG. 44 shows an alternative with a supporting gusset with horizontal movement rotating about a vertical shaft for the storage system. FIGS. 45 and 46 show a variant of the preferred solution of a folding bleacher, in this case with vertical rather than rotational movement capacity with respect to a rotating shaft. Furthermore, FIGS. 47 to 50 show a configuration of shorter retractable lattice girders, being of a length only slightly greater than the width of the pit, but requiring a double rolling in the lattice girder, and a double guidance-wheel in the transport carriages, the first for moving over the support slab, and the second for moving over the retractable lattice girders when they are deployed over the pit.

Figure 1:
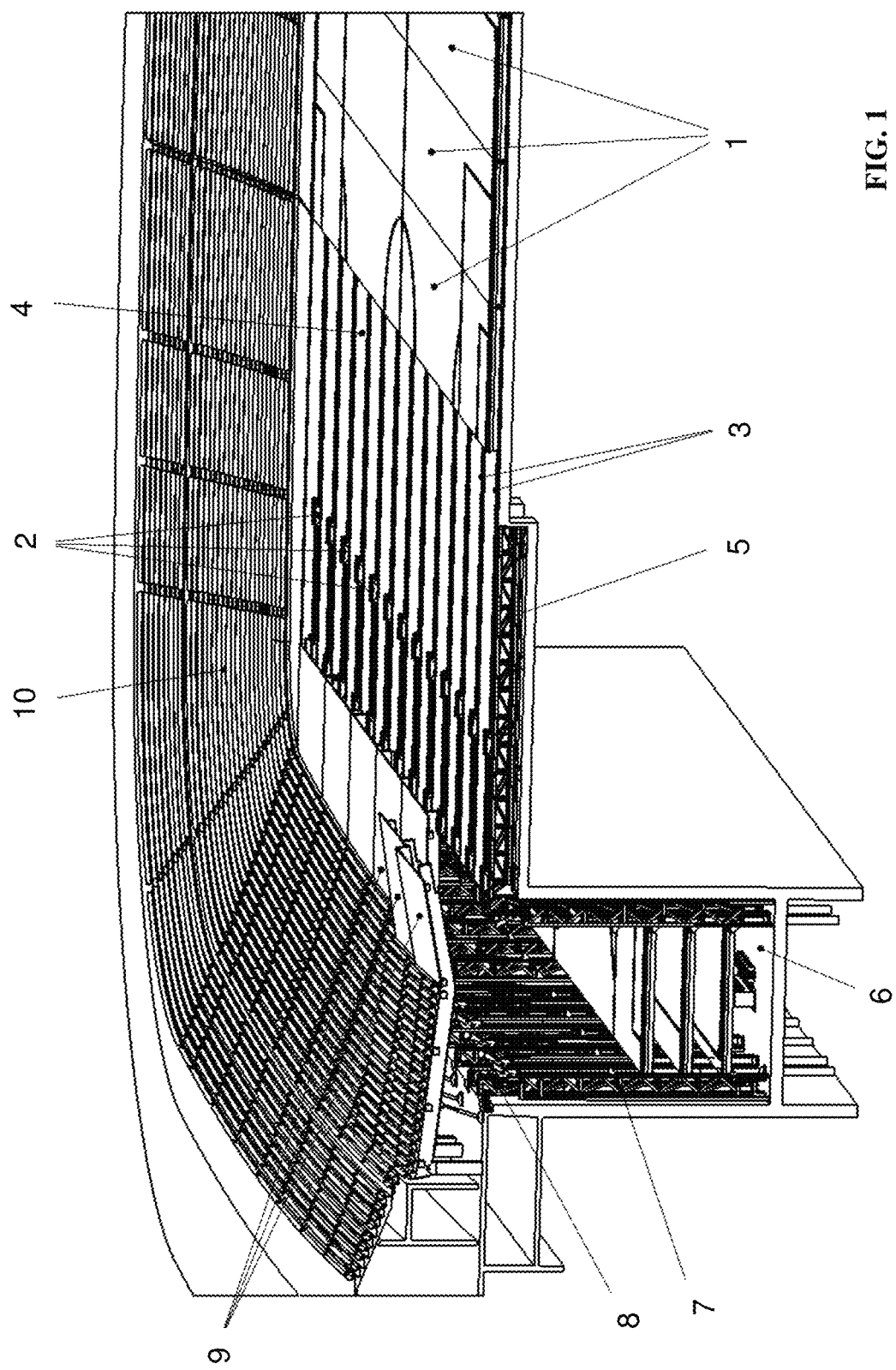
FIG. 1 shows a general schematic view of the system object of the invention in which the main elements thereof are identified.

These and the following figures refer to a set of elements which are:

1. Trays
2. Transport carriages
3. Rails
4. Support slab
5. Retractable lattice girders
6. Pit
7. Storage system
8. Lifting system
9. Folding bleacher
10. Fixed bleacher
11. Columns of the lifting system
12. Runners of the lifting mechanism
13. Guides of the hydraulic cylinders of the lifting mechanism
14. Supporting gussets of the lifting system
15. Telescopic hydraulic cylinders of the lifting mechanism
16. Hydraulic set
17. Columns of the storage system
18. Supporting gussets of the storage system
19. Pneumatic actuation of the supports of the storage system
20. Structure of the folding bleacher
21. Point of rotation of the folding bleacher
22. Actuation hydraulic of the folding bleacher
23. Structure of the retractable lattice girder
24. Actuation by means of geared motor and chain or belt of the retractable lattice girder
25. Guidance system by means of wheels and distribution equalizers of the retractable lattice girder
26. Securing system of the retractable lattice girder on both sides
27. Self-supporting structure of the tray
28. Natural or artificial field
29. Natural or artificial turf
30. Master transport carriage structure
31. Tray lifting system of the master transport carriages
32. Hydraulic set of the transport carriages
33. Electromechanical geared motors of the transport carriages
34. Guide wheels of the transport carriages
35. Slave transport carriage structure
36. Tray lifting system of the slave transport carriages
37. Tray joint closing mechanism in slave transport carriages
38. Mechanical securing system between master and slave transport carriages
39. Motors of the hydraulic set
40. Pumps of the hydraulic set
41. Tank of the hydraulic set
42. Storage system with horizontal gussets
43. Cable lifting system
44. Drum of the cable lifting system
45. Cable
46. Upper pulleys
47. Lower pulleys
48. Supporting gusset of the cable lifting system
49. Runner of the cable lifting system
50. Structure of the cable lifting system
51. Guide of the cable lifting system
52. Structure of the horizontal gusset storage system
53. Horizontal movement gussets of an alternative storage system
54. Liftable movable bleacher
60. Short retractable lattice girder
61. Double-wheeled transport carriage for use with short retractable lattice girder

DETAILED DESCRIPTION OF THE INVENTION

The object of the present invention is a reversible system which quickly and readily allows converting a stadium that has already been built into a multifunctional infrastructure by means of the removal and storage of the playing field, in an automated manner, in a pit built preferably on one side thereof.

This invention is furthermore consistent with the construction and implementation thereof without affecting the normal use for which the stadium was originally conceived, for example, for practicing football or soccer, using for the construction and commissioning thereof several of the time windows available between seasons.

As shown in the figures, the system is configured by a pit 6 preferably built on one side of the original playing field, in the same direction in which the new playing field is configured by means of bands. This new playing field is configured by means of several transportable trays 1, longitudinal as in the figure, or transverse, but only in a single direction, which will subsequently be stored by means of vertical movement into the pit 1 when the playing field is to be removed for holding other events. Each tray 1 will be self-supporting and will have all the layers of the field, irrigation system, natural or artificial turf, etc., to be equivalent to the original field. There will be a series of transport carriages 2 which, moving over rails 3 embedded in a support slab 4, generally made of concrete, will allow shifting in a synchronized manner the trays horizontally in a direction perpendicular to the dominant length thereof. In this system object of the invention, there is an assembly of retractable lattice girders 5, there being as many as there are number of master+slave transport carriages defined, which allow continuing the guided movement of the carriages over same, and which previously deployed over the pit, will allow the transport of each tray over the vertical thereof, for subsequently causing them to be lowered by means of a hydraulic lifting mechanism 8 to the corresponding storage position in the storage system 7. If required, if there is not sufficient space for building the pit on one side without invading part of the space occupied by the bleachers, there will be configured new folding bleachers 9 which are lifted in sections to allow the trays to be introduced in the pit, and they are folded over said pit, covering it for use when holding any type of event. The fixed bleachers 10 will be the original ones if this system is implemented in a stadium that has already been built.

Figure 2:
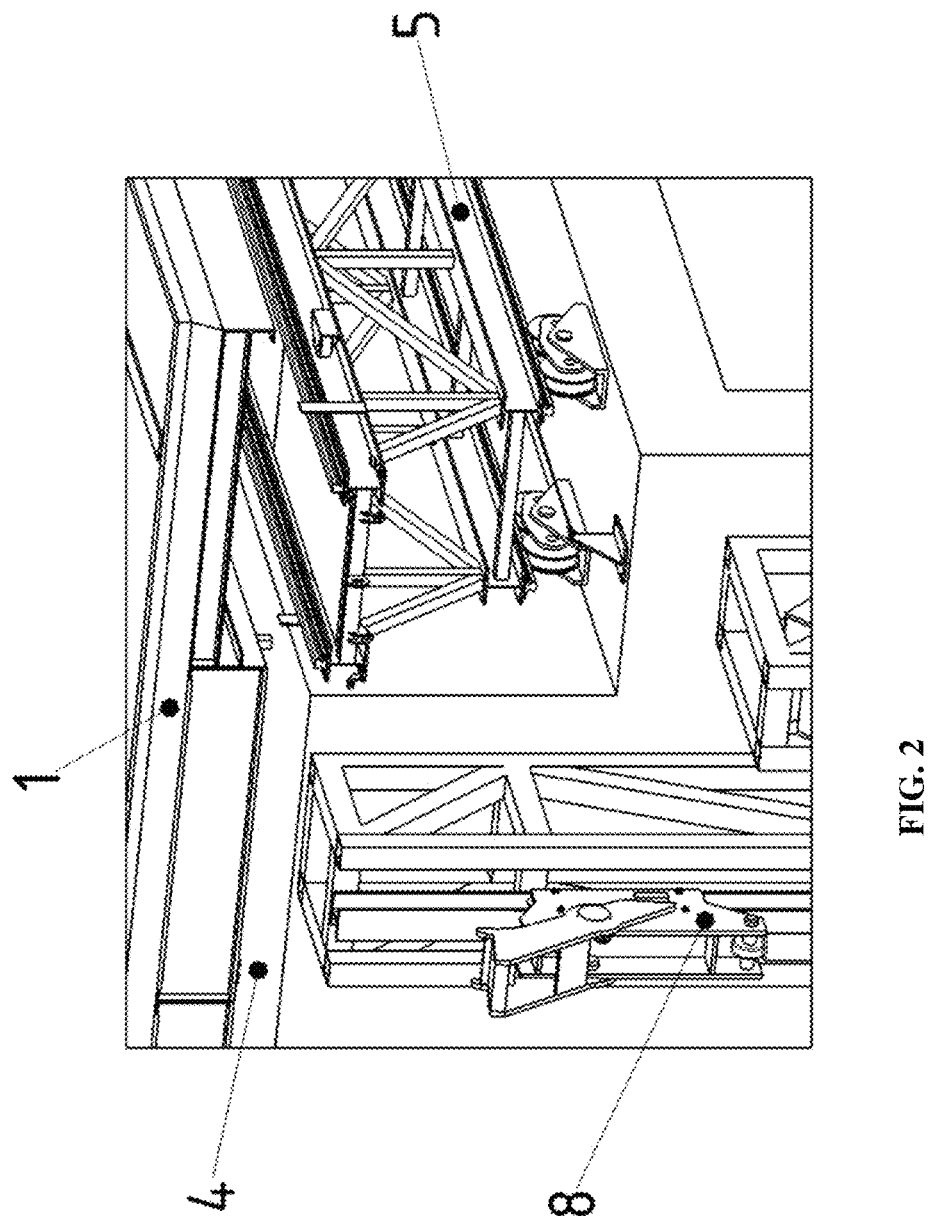
FIGS. 2 to 4 sequentially show a detail of one of the trays forming the playing field recently removed from the pit and located at the edge thereof, and where one of the retractable lattice girders is also shown.
Figure 3:
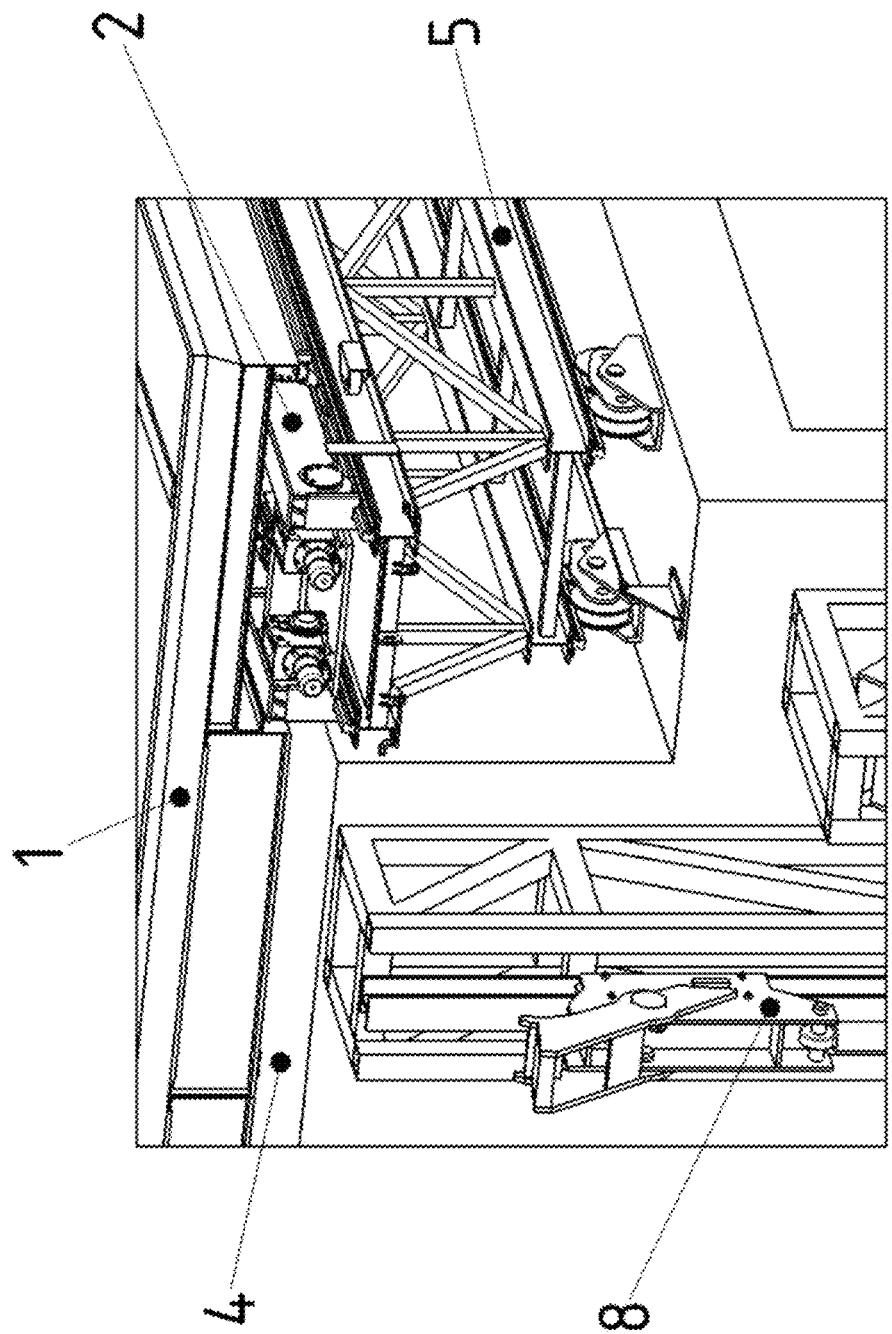
Figure 4:
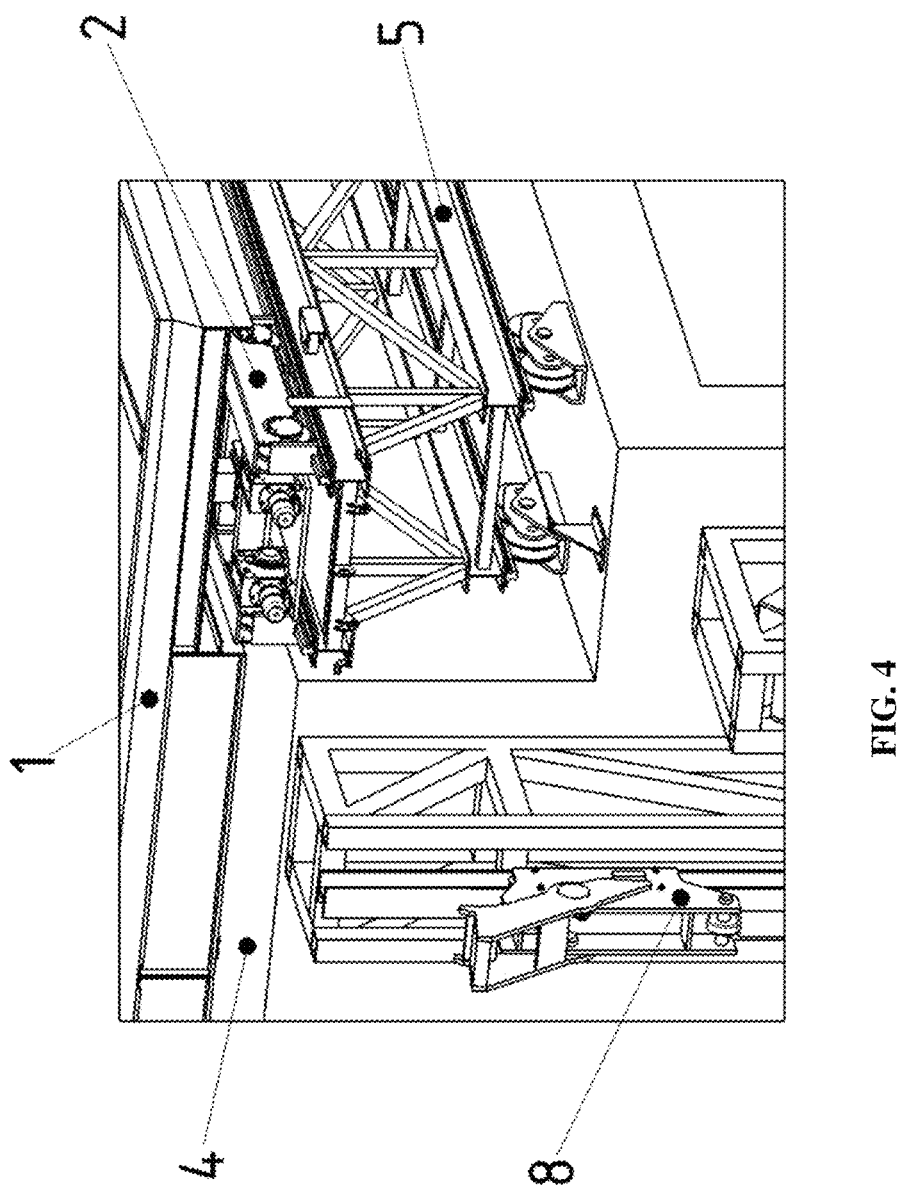

FIGS. 2 to 4 show the sequential detail of one of the trays 1 recently removed from the pit 6 and located at the edge thereof, and they also show one of the retractable lattice girders 5 in the retracted position on the field side; in FIG. 3 the corresponding transport carriage 2 is located in a position below the tray 1; and in FIG. 4 it is hoisted in a synchronized manner with the rest of the transport carriages, ready for transporting it towards the field side to its final corresponding position for forming the playing field.

Figure 5:
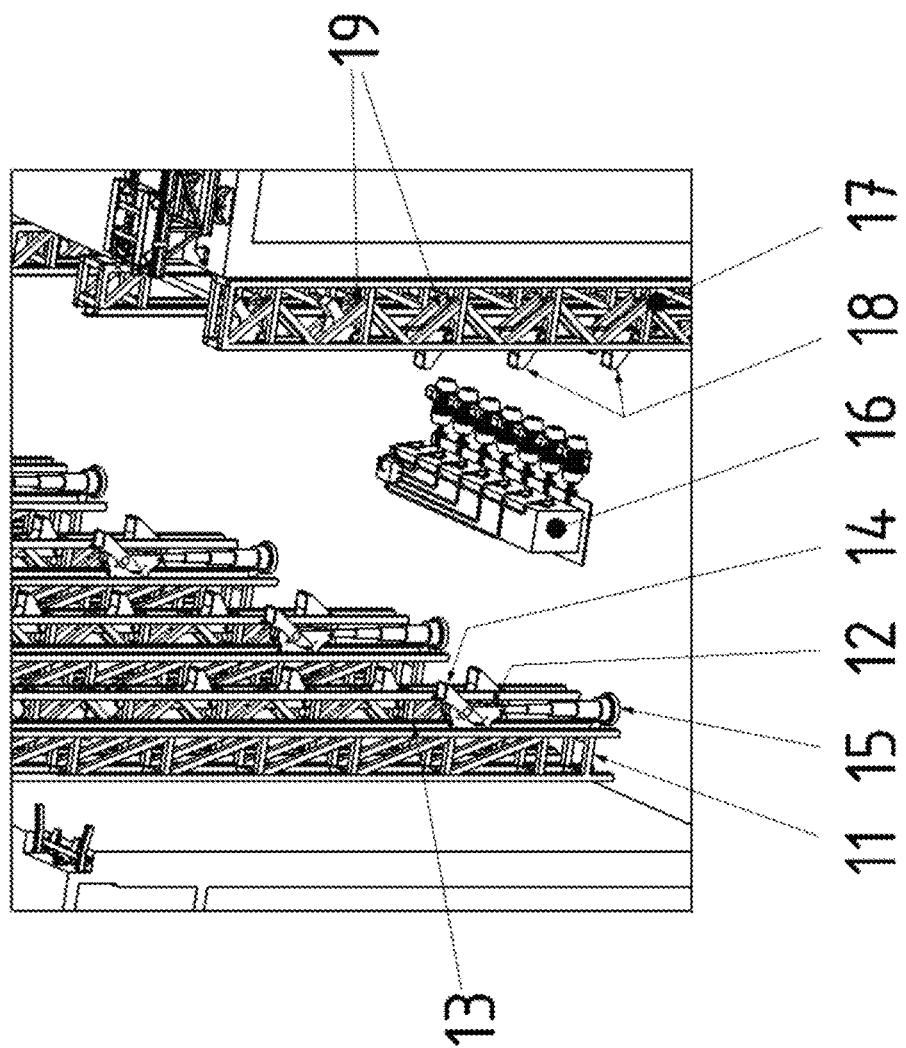
FIG. 5 shows a view of the lifting system, with the telescopic hydraulic actuators and the structural columns with which both the lifting mechanism and the storage system are configured, with all the main components thereof.

FIG. 5 shows a view of the lifting system 8, with its telescopic hydraulic cylinders 15 having runners 12 at the ends thereof, guided along the entire path thereof by the guides 13, and having mounted thereon supporting gussets 14 which, in this preferred embodiment, move vertically rotating about a horizontal shaft, so as to be folded or deployed and grab the tray by means of a pneumatic or alternatively electromechanical actuation. The structure of the lifting mechanism is configured by means of an assembly of columns 11, one for each hydraulic cylinder, which are preferably anchored on the two side walls of the pit. The lifting system is hydraulic in a preferred embodiment and actuated by means of an assembly of hydraulic sets 16. For storing the trays in the pit, each of them in the corresponding position but independently, the storage system 7 has been configured by means of a structure of other columns 17 which are preferably anchored on the two side walls of the pit and may or may not be connected with the columns of the lifting system 8; each of them having an assembly of supporting gussets 18, there being as many of the latter as there are number of trays to be stored, and actuated by means of a system 19 which will preferably be pneumatic but can also be electromechanical. In the preferred embodiment of the supporting gussets 18 of the storage system 7, these gussets are configured so that each of them moves vertically, rotating about a horizontal shaft installed in the structure of the column 17.

The number of columns of the lifting system 8 does not have to coincide with the number of retractable lattice girders 5, nor with the number of columns of the storage system 7. The number and the position of the retractable lattice girders 5 will necessarily coincide with the ones of the transport carriages 2. If, for example, 13 retractable lattice girders are arranged for supporting each tray, configured in this case in the longitudinal direction, 13 transport carriages will also have to be arranged and aligned in position with the lattice girders. Furthermore, if in a preferred embodiment each of them is configured by means of a master transport carriage plus a slave transport carriage connected to one another, there will therefore be 13 master transport carriages and 13 slave transport carriages. Both the number of columns of the lifting system 8 and of the storage system 7 will be double, one row of them on each side wall of the pit, and preferably a similar total number thereof, in this case 13 plus 13, for both the lifting system 8 and the storage system 7; but in both cases the value may differ.

Figure 6:
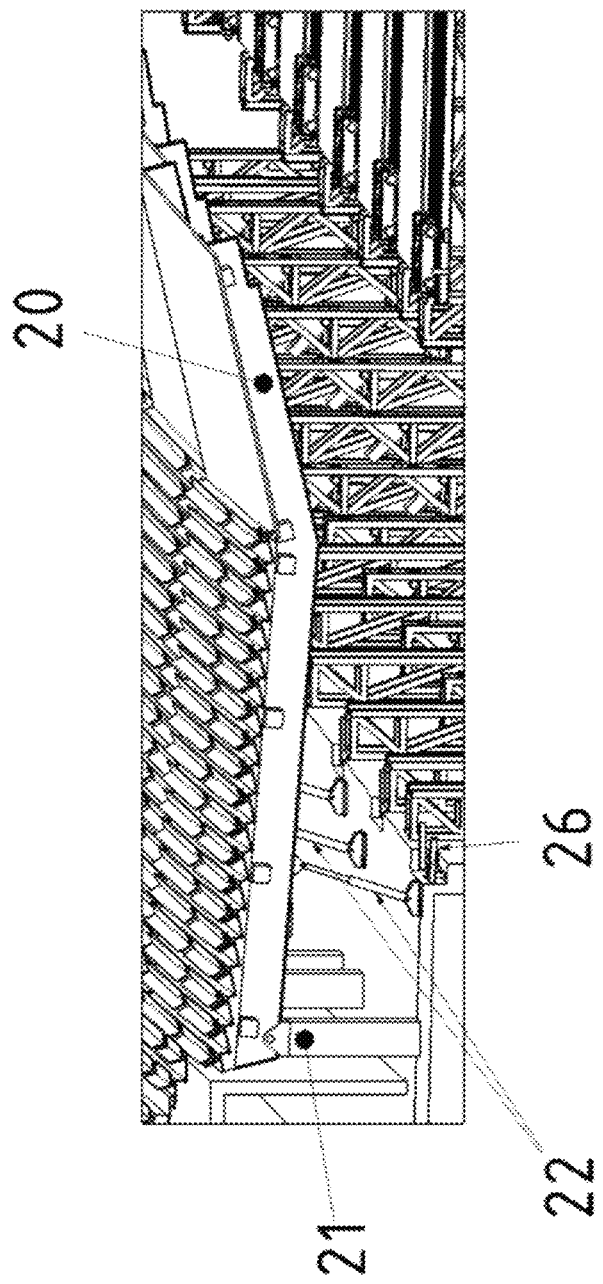
FIG. 6 shows a view of the folding bleacher, if required, in the deployed position, for allowing the extraction or storage maneuvers of the playing field, provided that they had to be installed given a lack of sufficient space for building the pit on one side of the field without invading part of the space occupied by the original bleachers.

FIG. 6 shows a view of the folding bleacher 9, if required, in the deployed position, so as to allow the maneuvers of extracting or storing the playing field, provided that there is not sufficient space for building the pit on one side of the field without invading part of the space occupied by the original bleachers. There can be seen therein the bearing structure 20 of the bleacher, configured in sections, and folded, broken down around the fixed point 21 actuated by the assembly of hydraulic cylinders 22 defined in a preferred embodiment object of the invention. This figure also shows the receiving and anchoring securing mechanisms 26 to assure the correct termination of the maneuver of each retractable lattice girder 5, in this case on the bleacher side, when the lattice girder is deployed over the pit.

Figure 7:
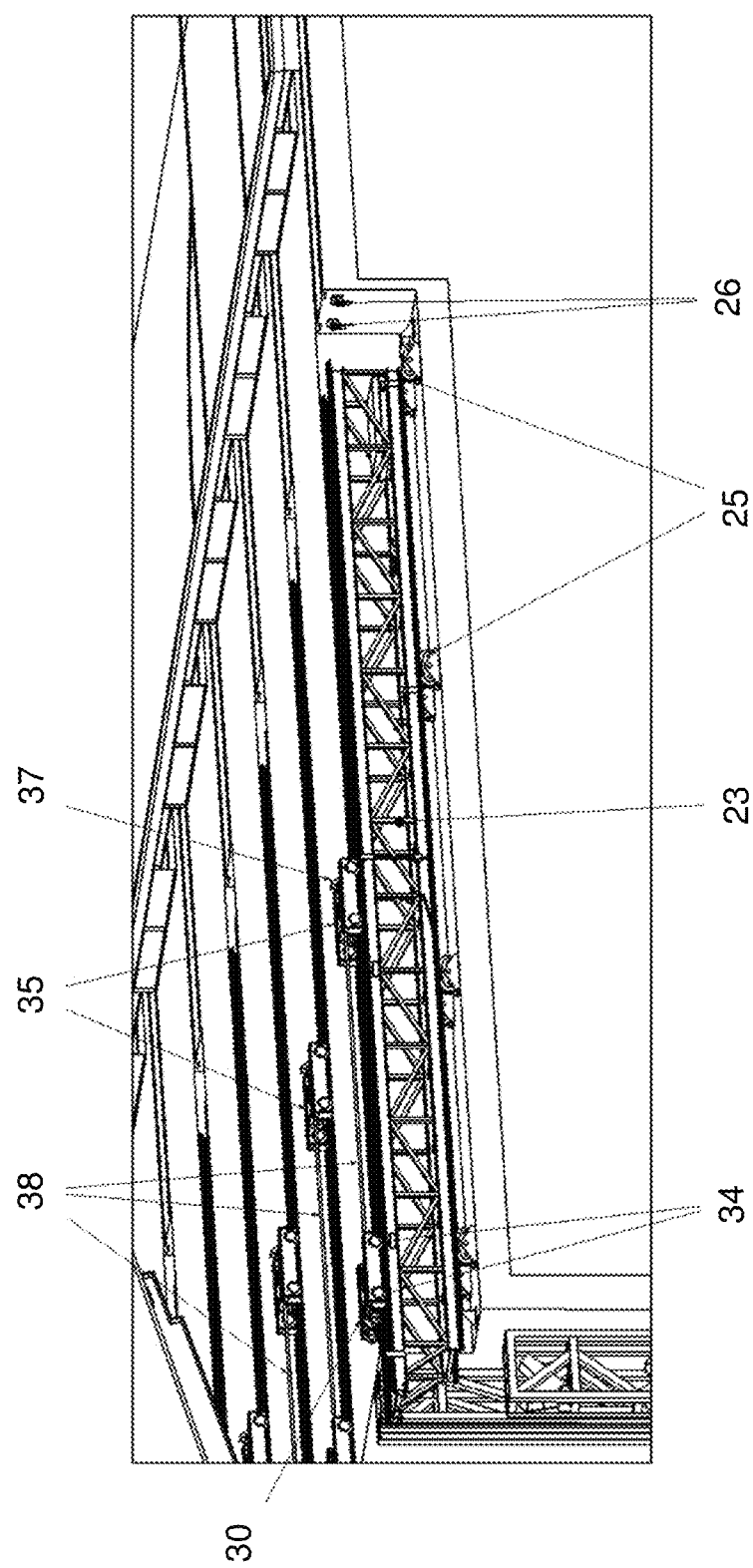
FIG. 7 shows the assembly of the support slab, system of retractable lattice girders, and system of transport carriages, and the interfaces between them.

FIG. 7 shows sufficient details of the assembly comprising the support slab 4, the system of retractable lattice girders 5, and the system of transport carriages 2 and the interfaces between them. It shows the metallic bearing structure 23 of the retractable lattice girder 5, the guidance system 25 by means of dual wheels of the retractable lattice girder, all having distribution equalizers, and the receiving and anchoring securing mechanism 26 to assure the correct termination of the maneuver of the retractable lattice girder, in this case on the field side, when the lattice girder is retracted. The transport carriages 2, in this case on the retractable lattice girder 5, are also shown, wherein the bearing structure 30 of the master transport carriage and the guide wheels 34, the bearing structure 35 of the slave transport carriage and the tray joint closing mechanism 37 are shown in detail, as is the mechanical securing system 38 between the master and slave transport carriages for integral movement.

Figure 8:
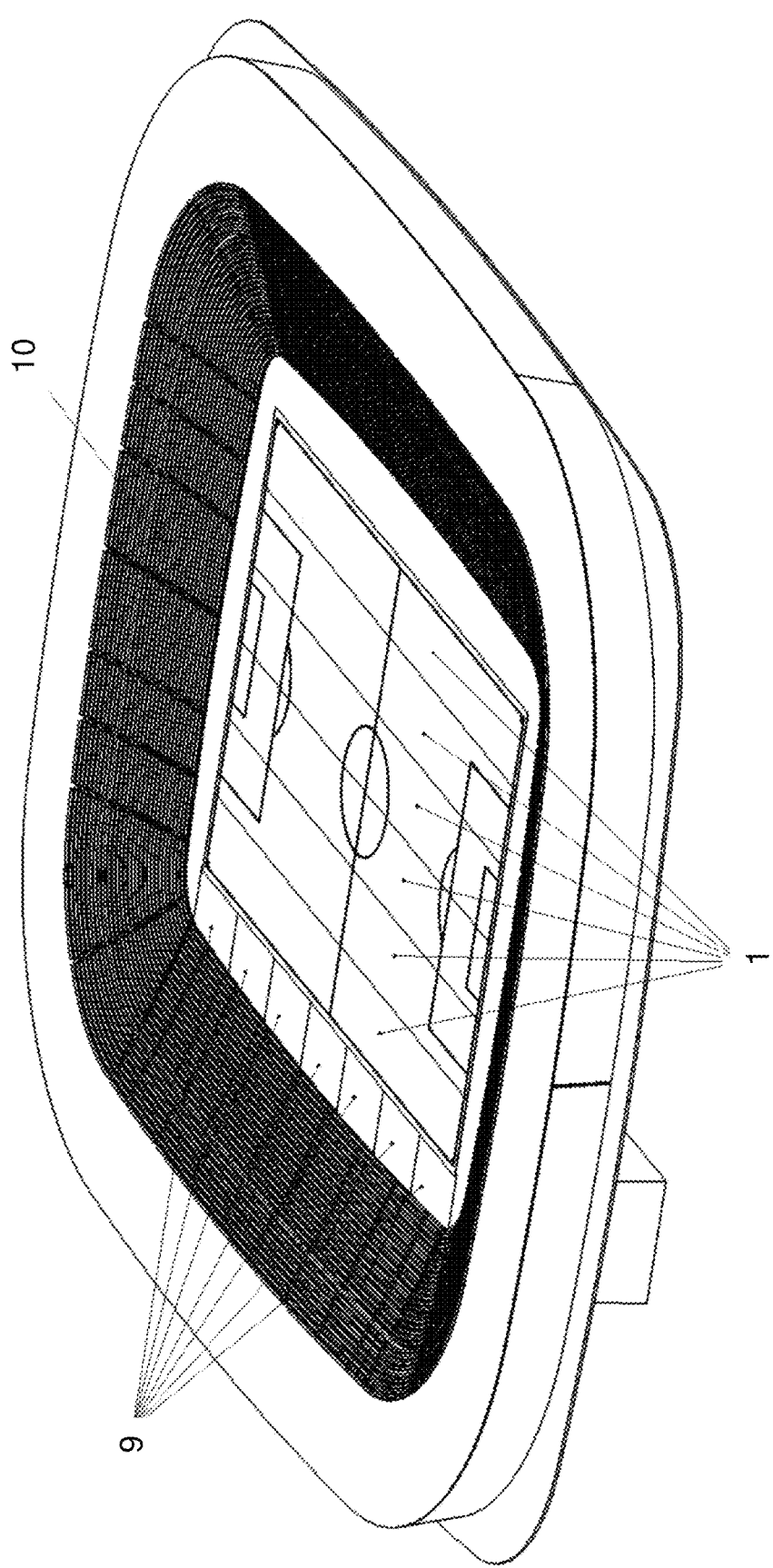
FIGS. 8 to 23 schematically show the sequence for storing the playing field in the greenhouse pit designed for that purpose.
Figure 9:
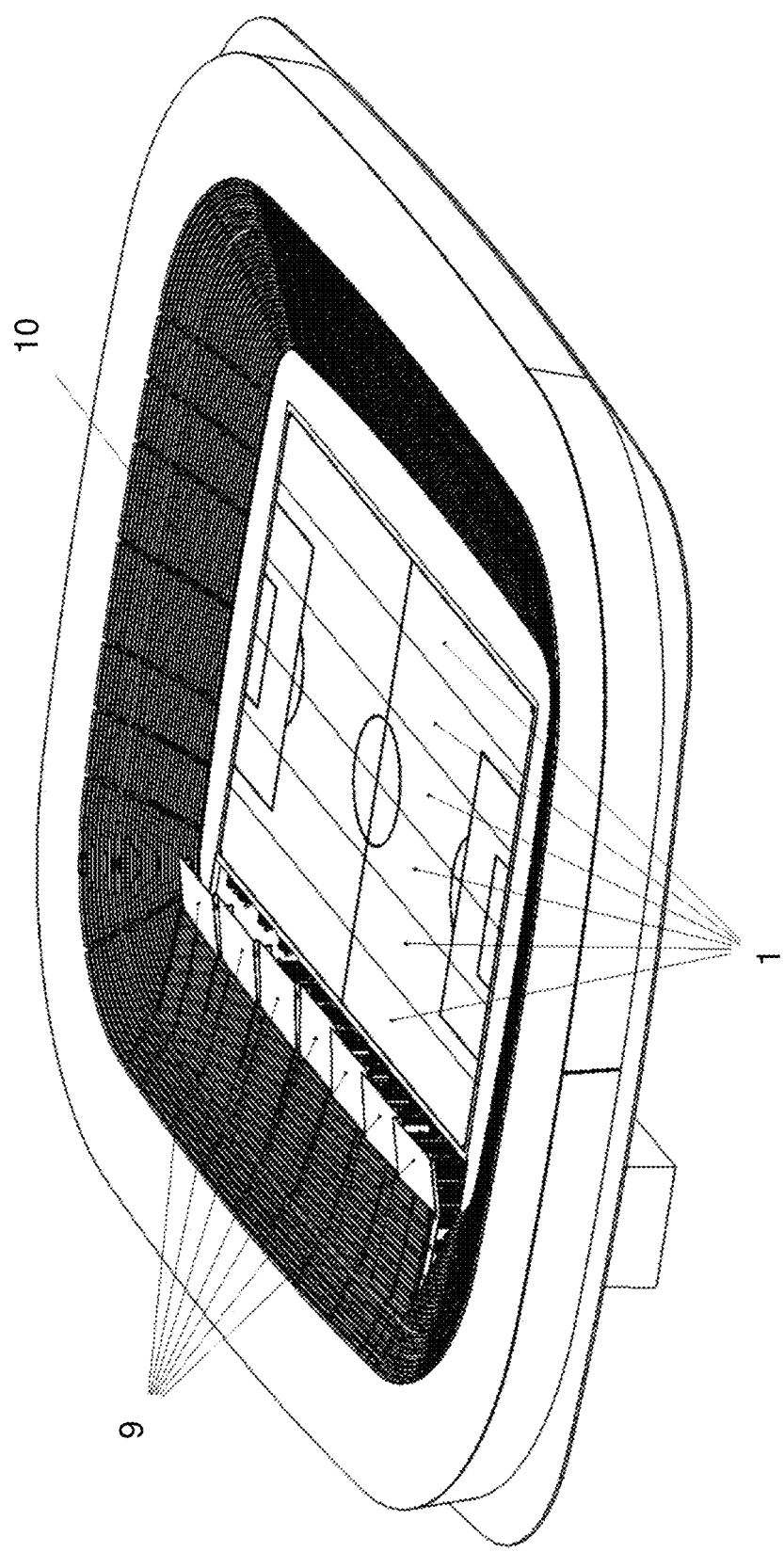
Figure 10:
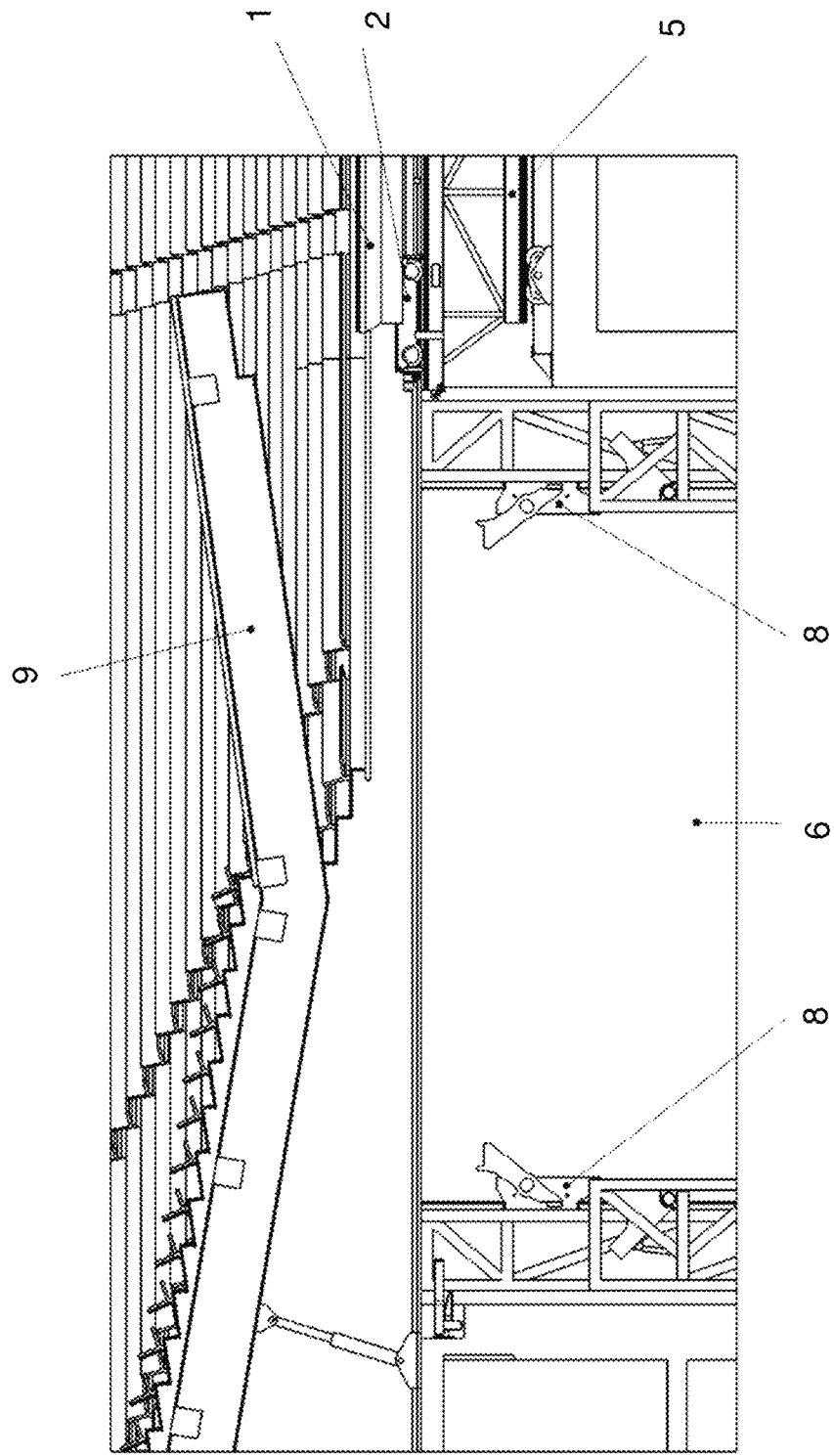

The sequence to be performed for storing the playing field in the greenhouse pit designed for that purpose, which will help to illustrate the scope of the system object of this invention, will be explained in detail below. FIG. 8 shows the new playing field, configured in this case by means of six longitudinal trays 1, taken out and ready, for example, for a football or soccer game to be played, and in which the folding bleachers 9 are in the folded position, and generally provided at the ends thereof with retractable bleacher modules, not depicted, which when deployed close, seal, and provide continuity to the new playing field of this invention based on bands of trays. FIG. 9 shows the folding bleachers 9 in the deployed position to start the maneuver for removing turf with this system object of the invention. FIG. 10 to FIG. 21 sequentially show with a cross-section view of the pit the entire maneuver of the entry of one tray until it is placed in its final storage position. It can be observed in FIG.

Figure 11:
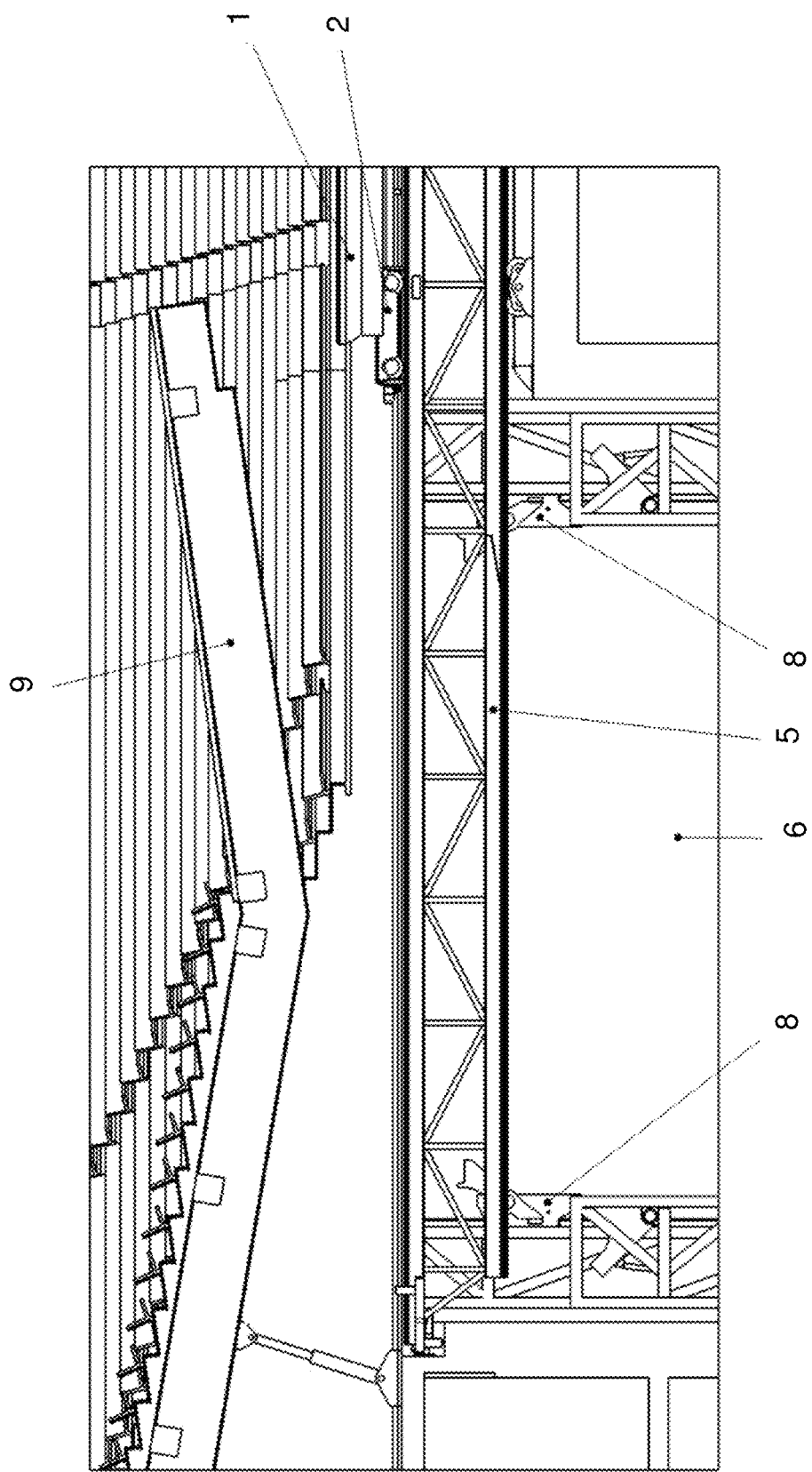
Figure 12:
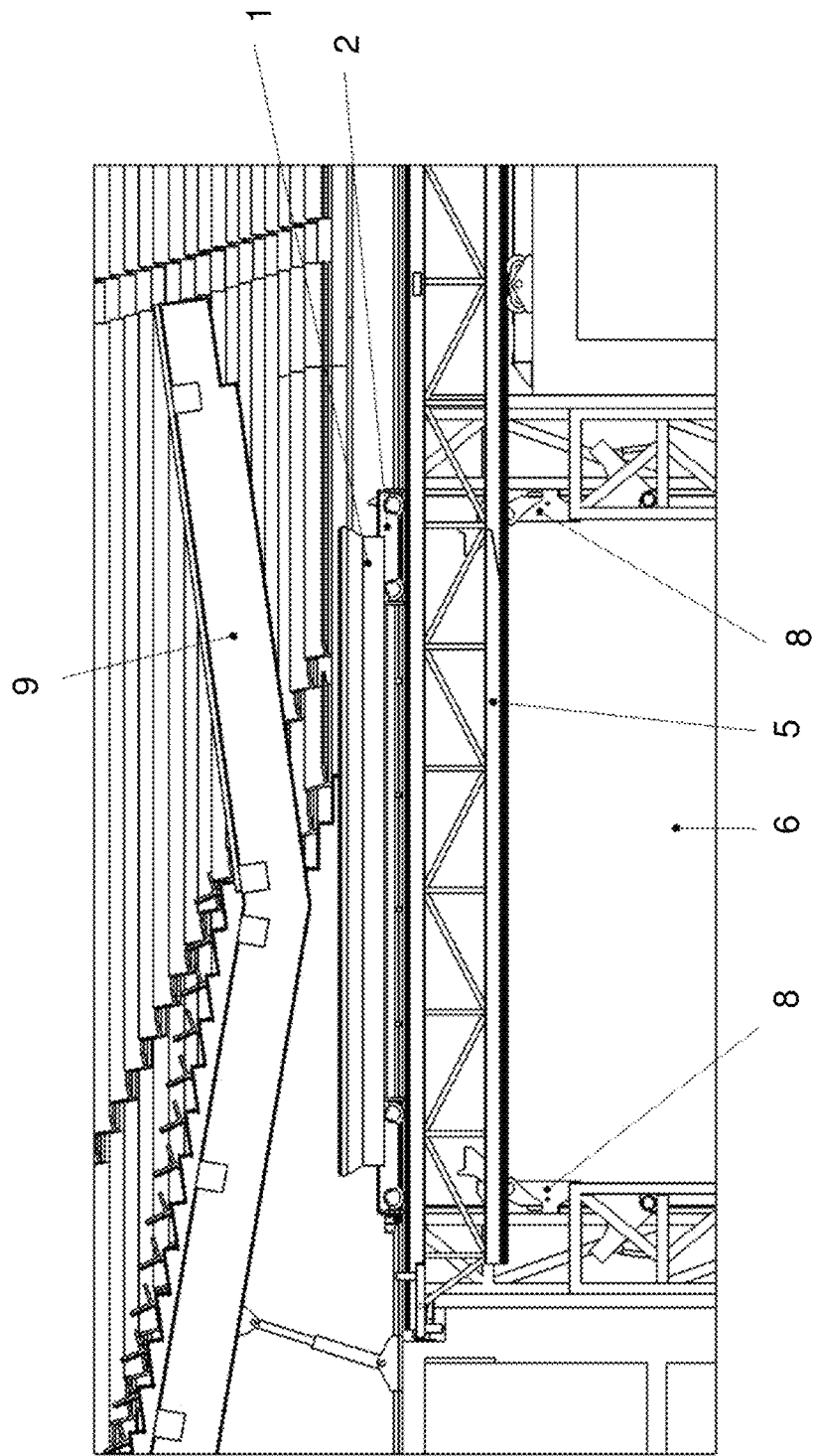
Figure 13:
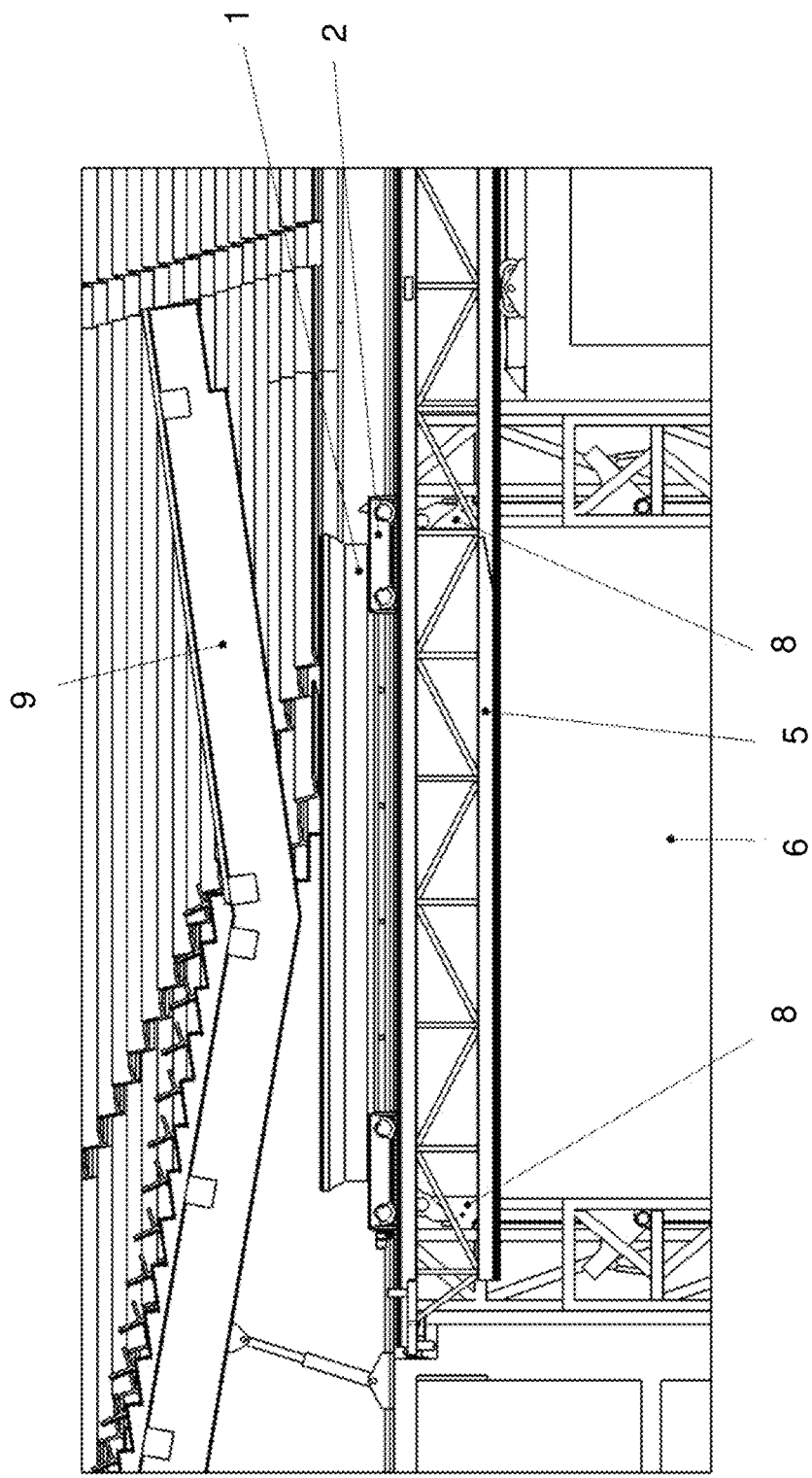
Figure 14:
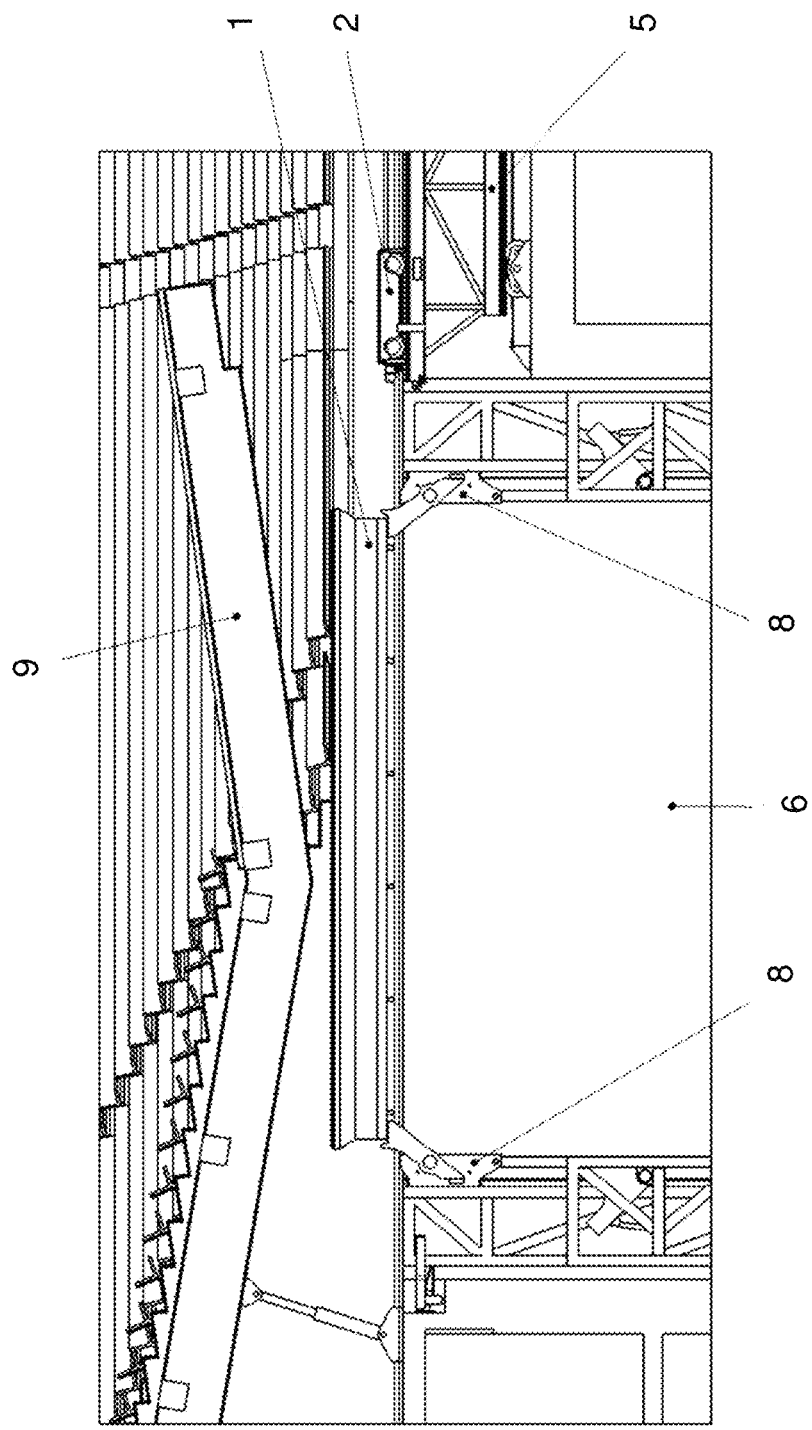
Figure 15:
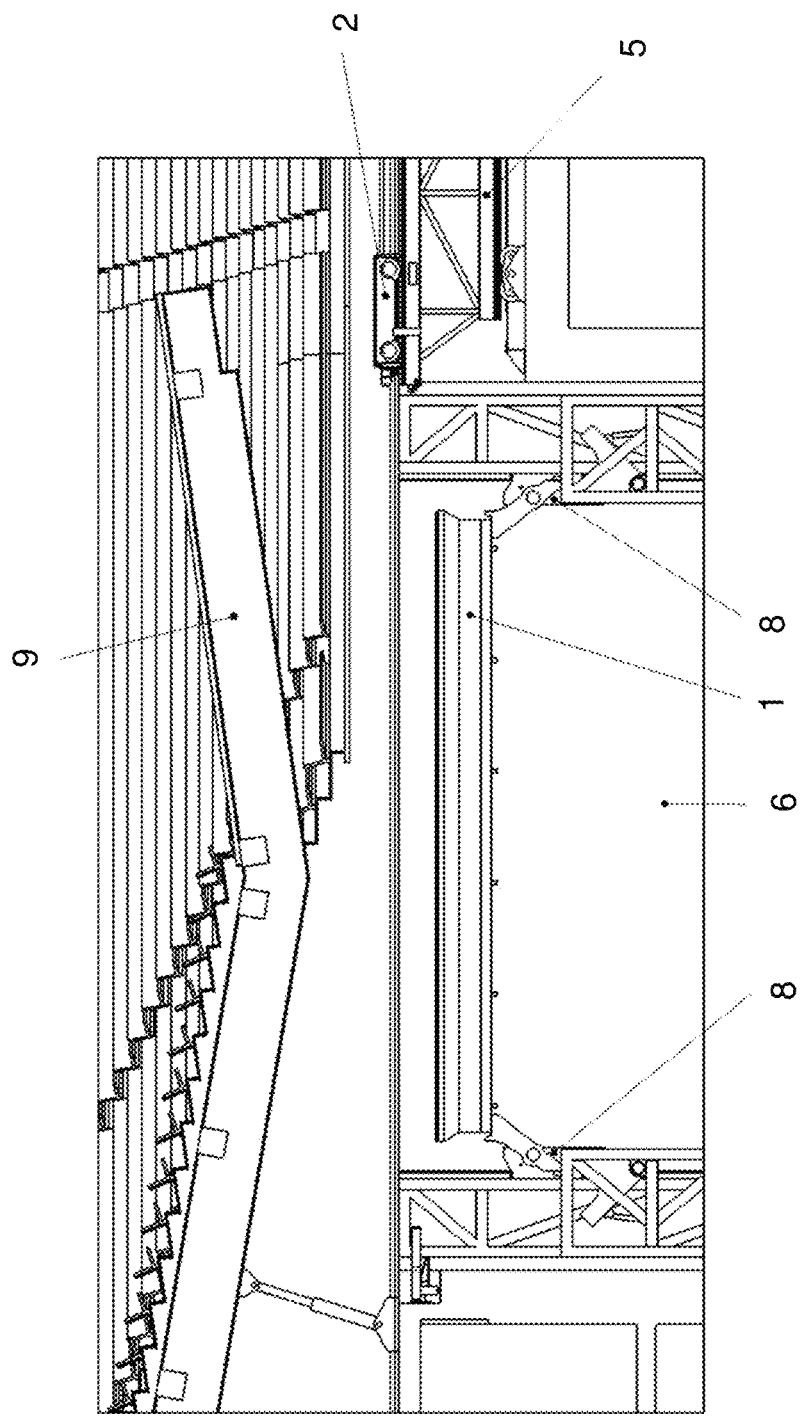
Figure 16:
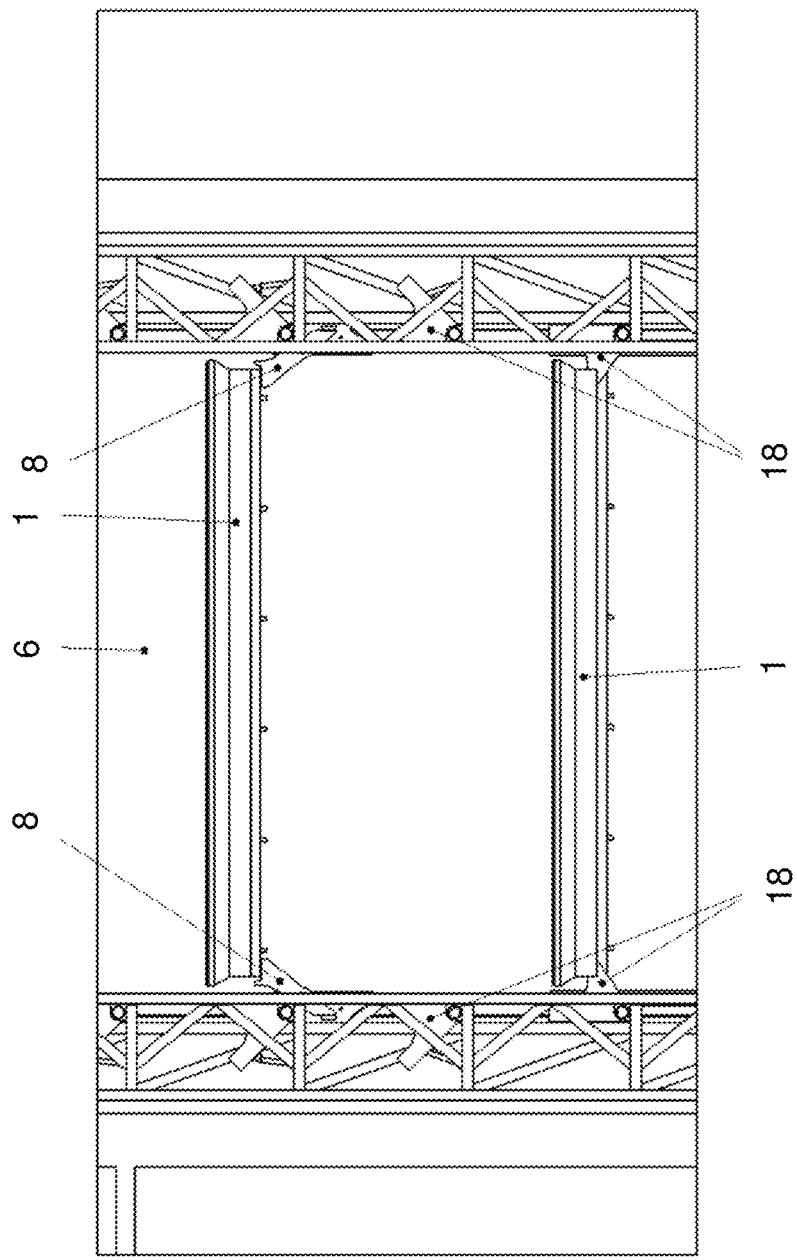
Figure 17:
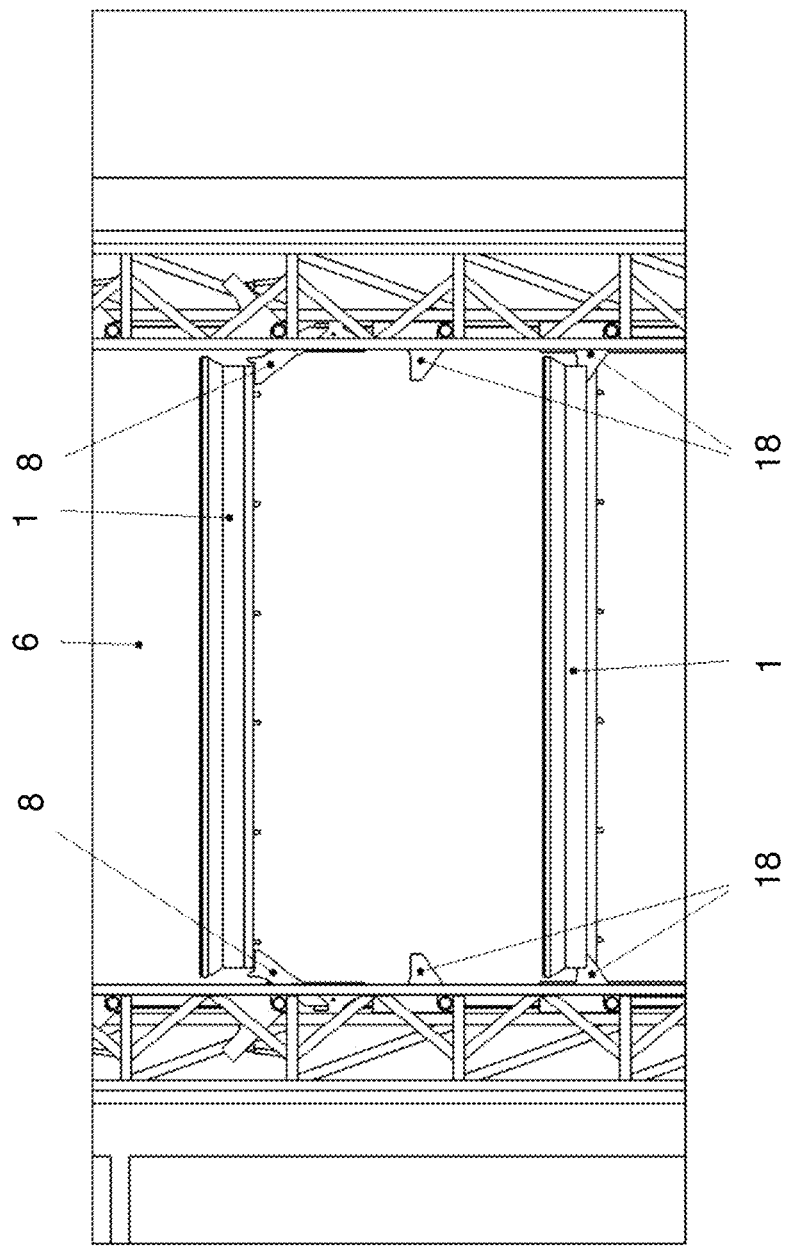
Figure 18:
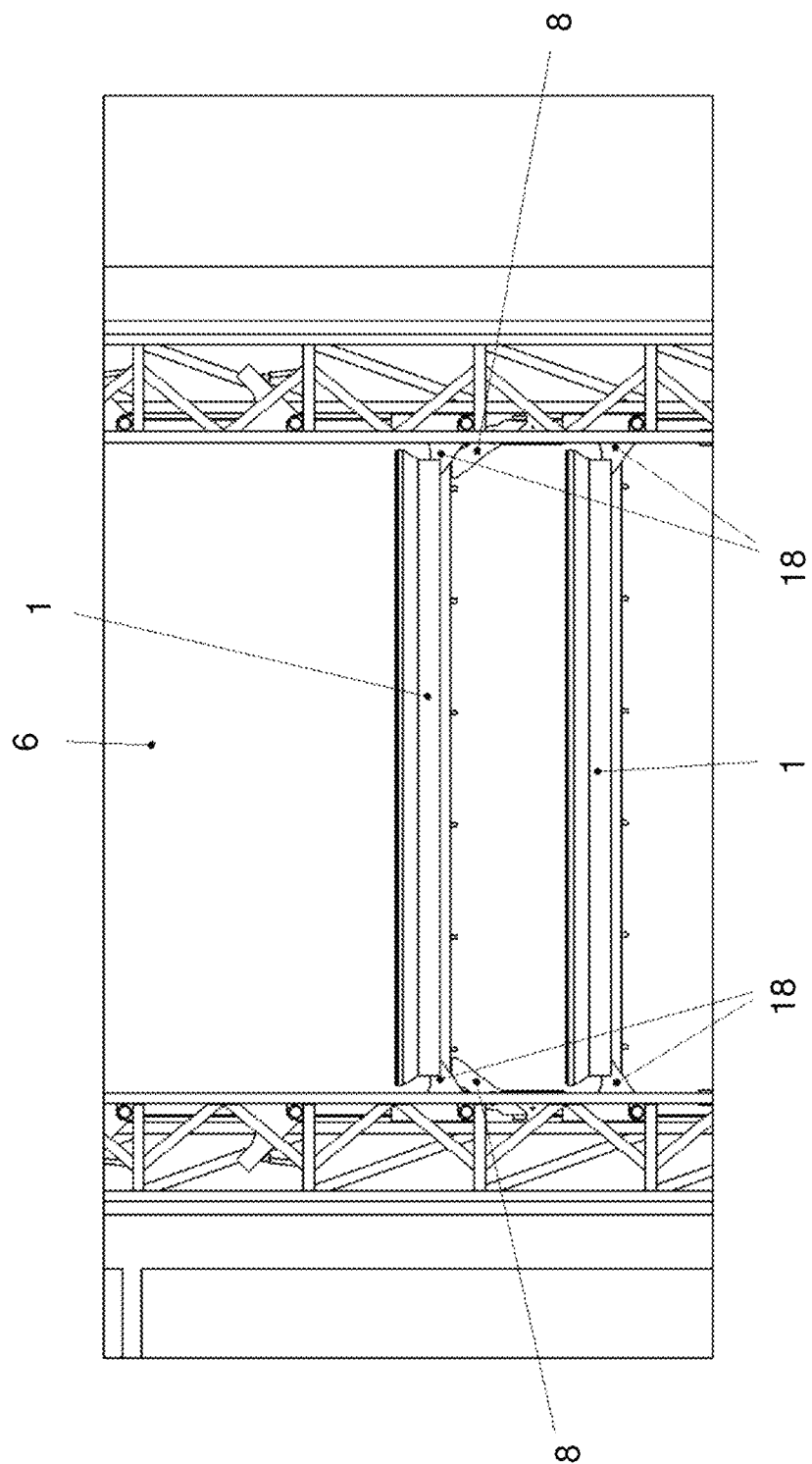
Figure 19:
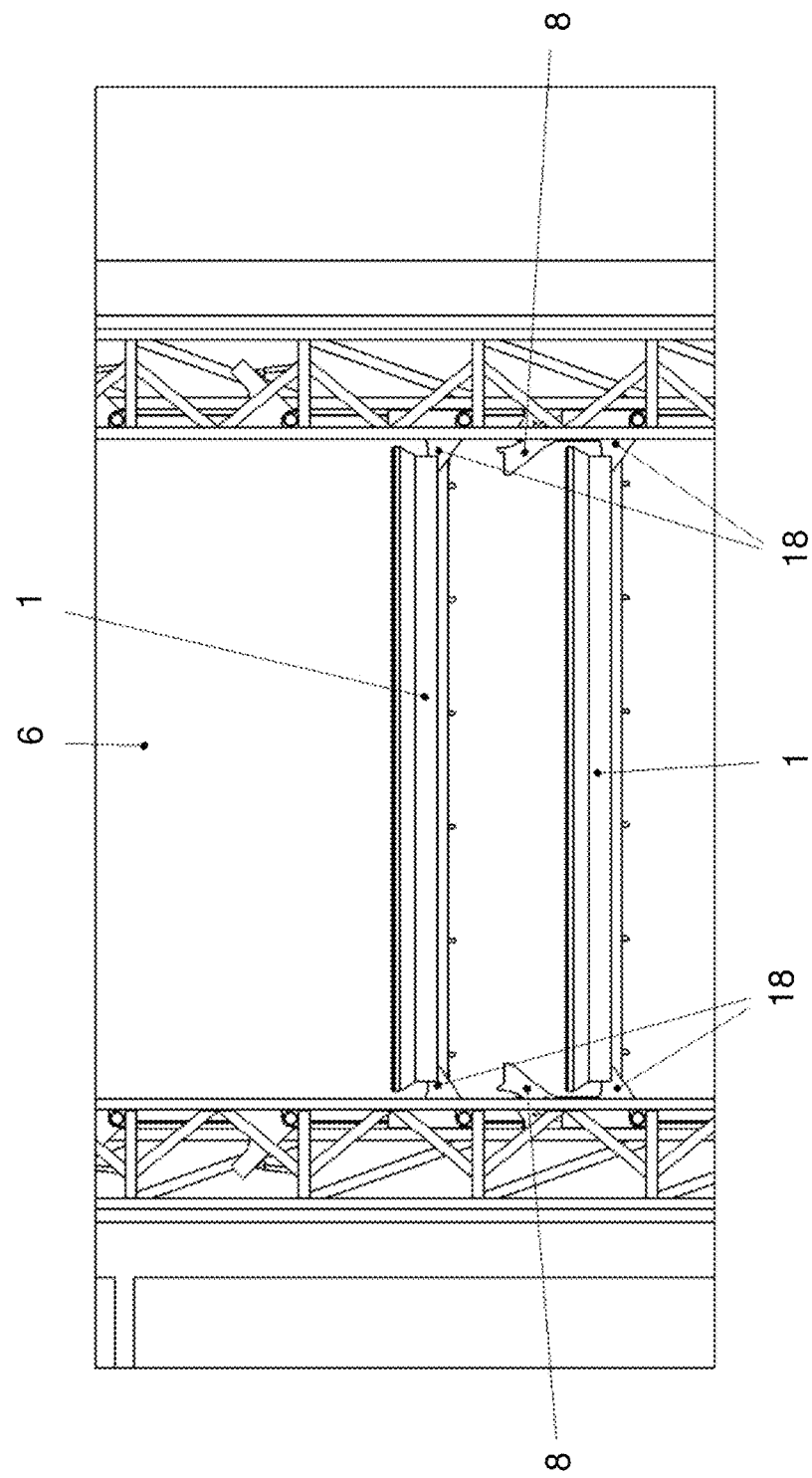
Figure 20:
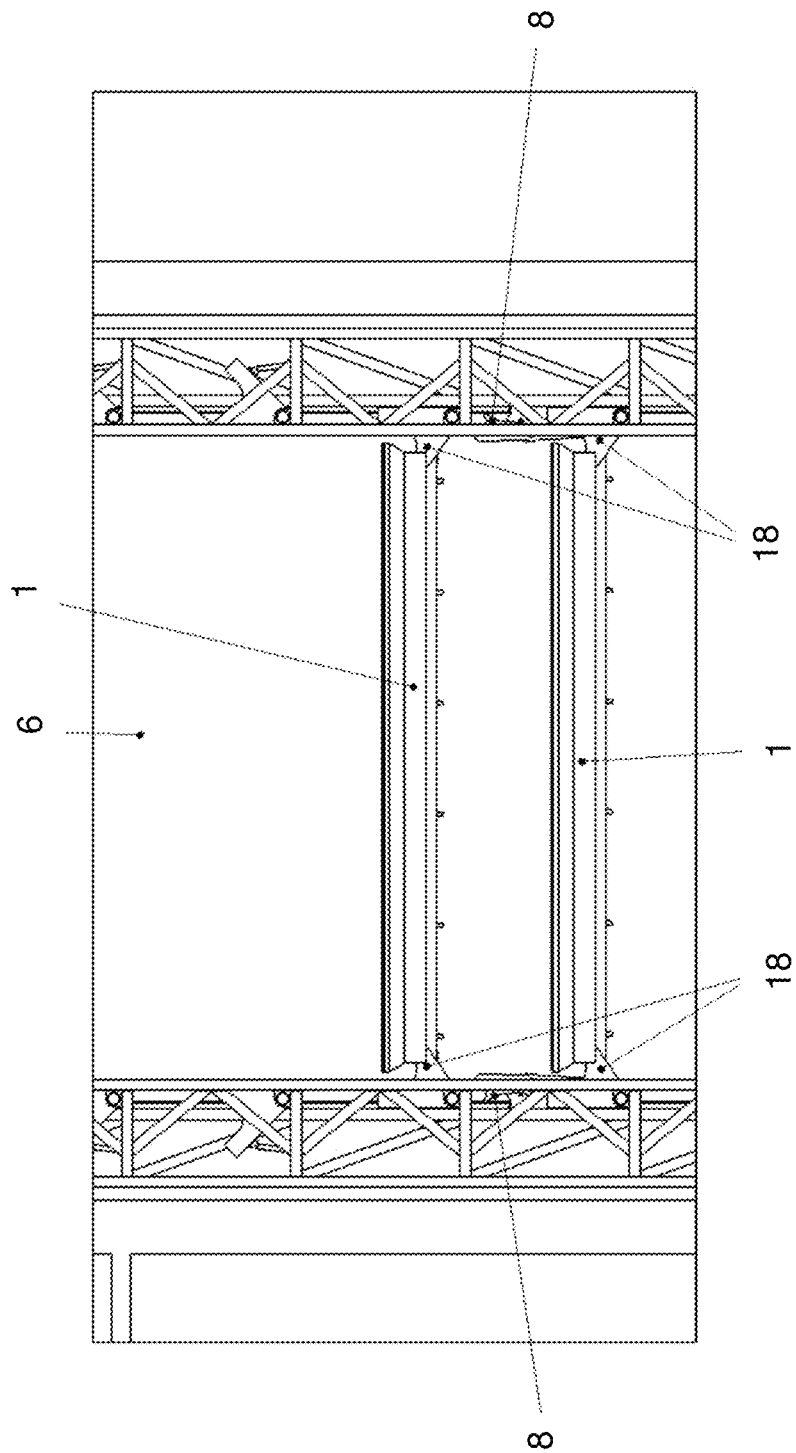
Figure 21:
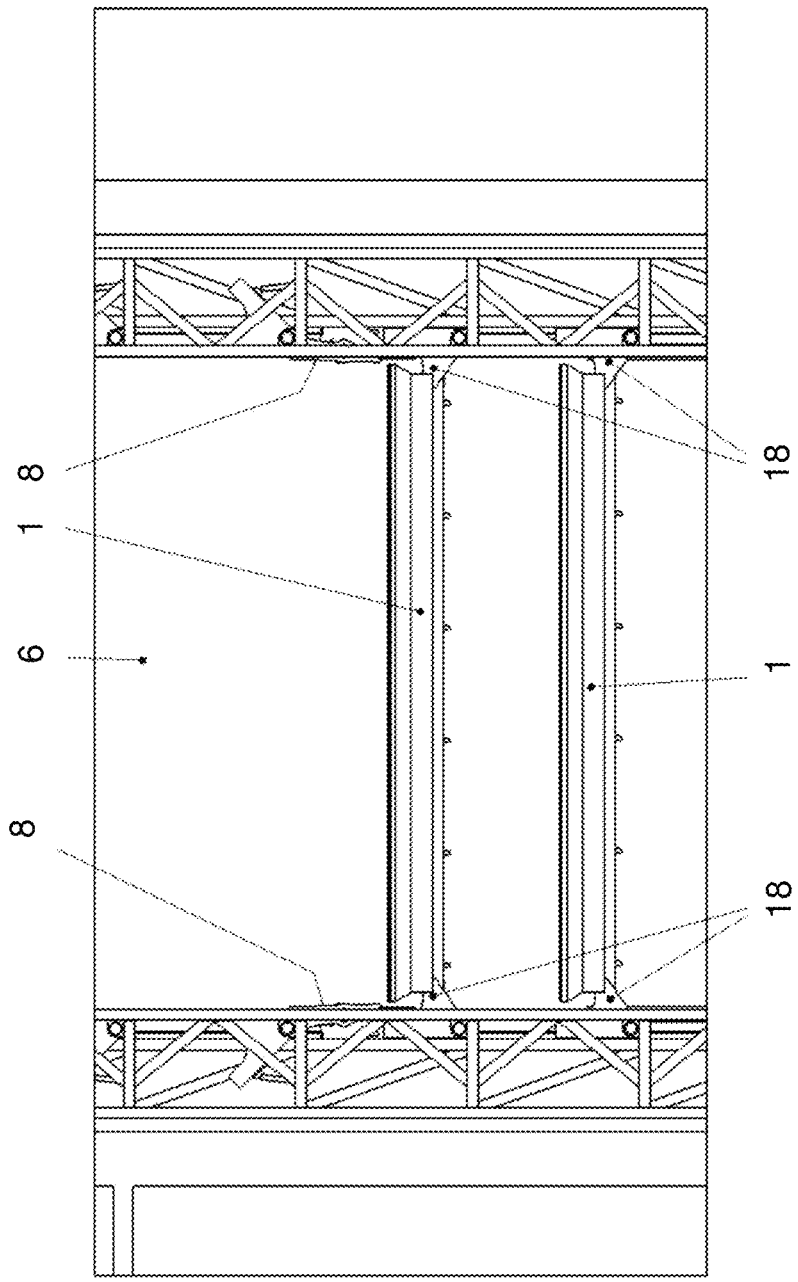
Figure 22:
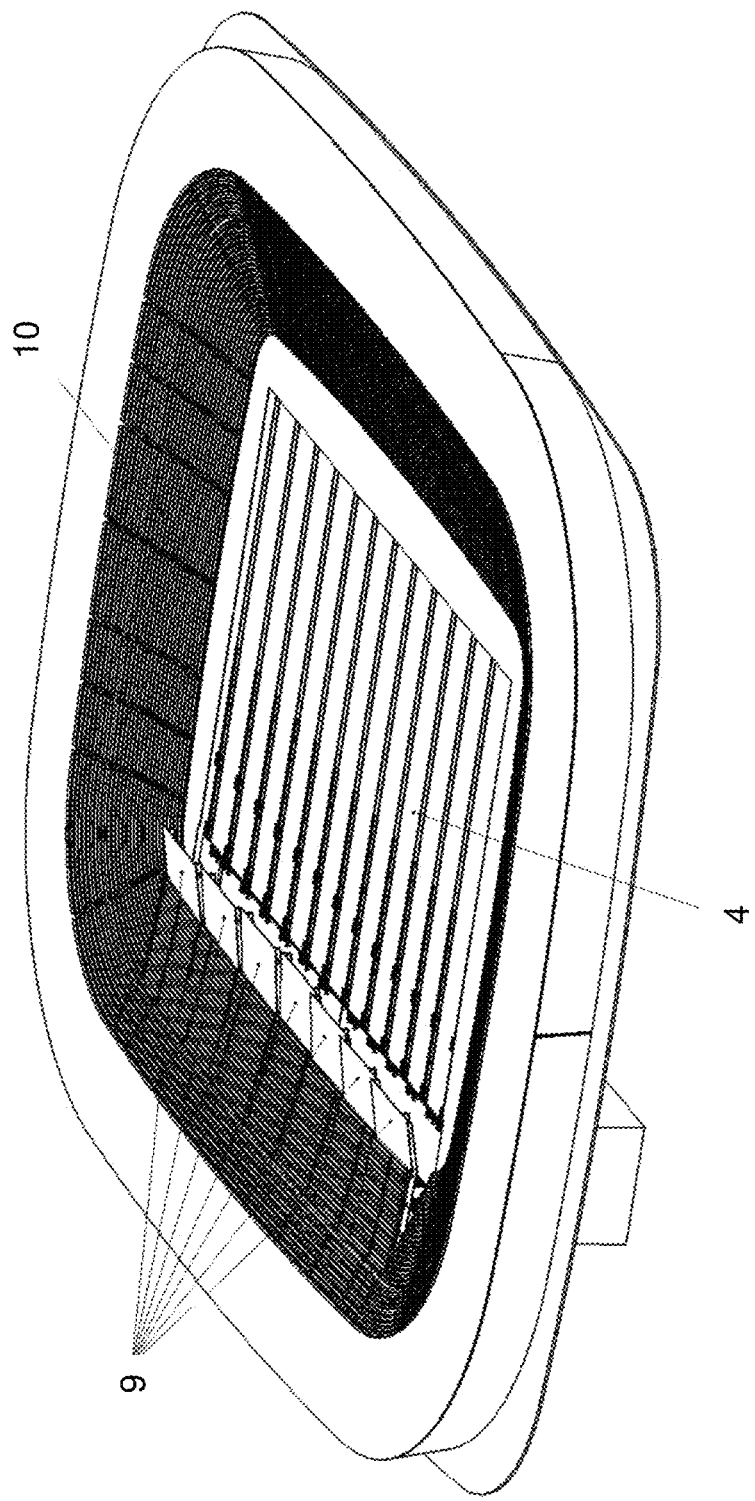
Figure 23:
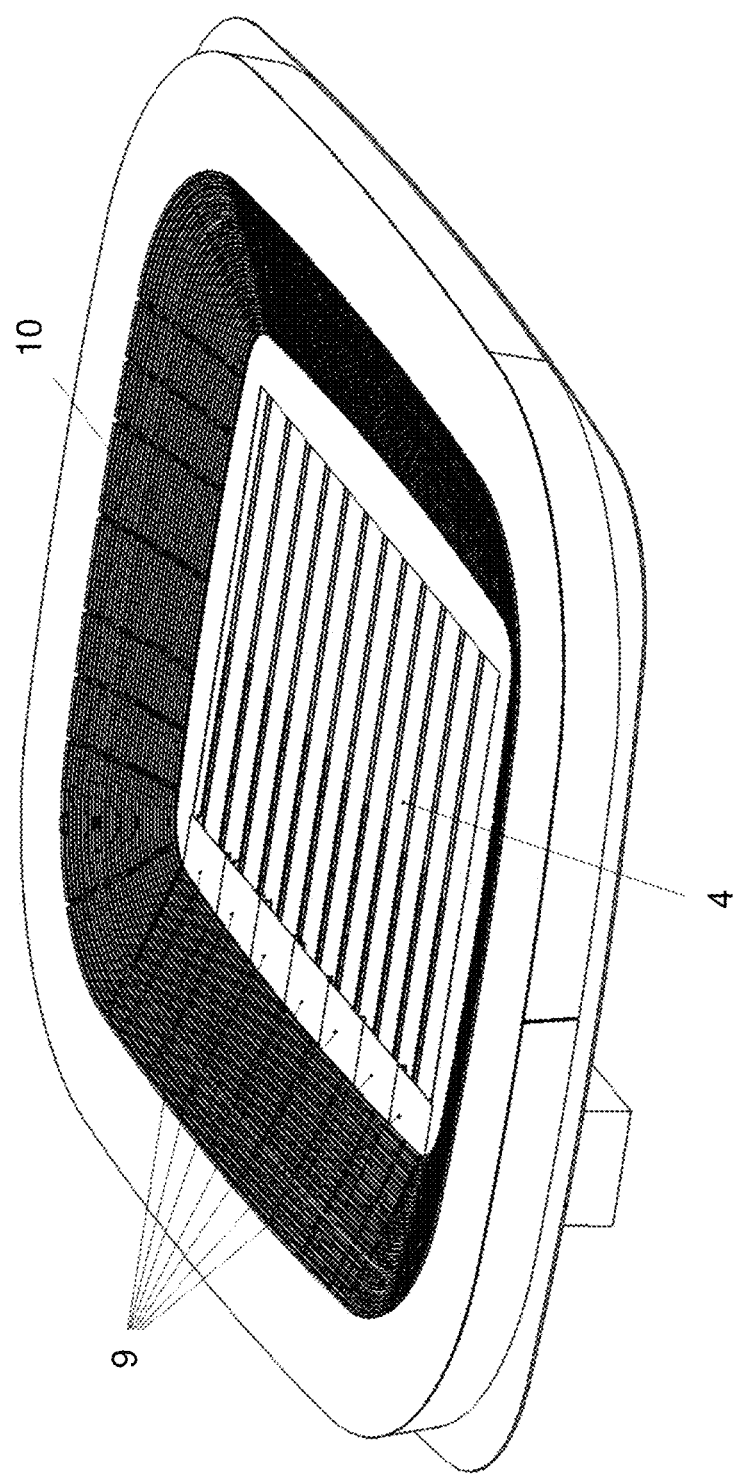

10 how the lifting mechanism 8 is in standby with the supporting gussets 14 deployed, and how the corresponding tray 1 to be introduced is already positioned at the edge of the pit 6 and has been lowered in a synchronized manner on the support slab 4 for releasing the retractable lattice girders 5 and the transport carriages 2 mounted thereon. Then the retractable lattice girders 5 are deployed over the pit 6 and anchored on the bleacher side by means of the anchorings 26; the transport carriages 2, which were on the lattice girders, go back to find the tray, are positioned, and hoist it in a synchronized manner by means of their lifting systems 31 and 36 of the master and slave carriages, respectively. This situation is shown in FIG. 11. FIG. 12 shows the tray 1 transported in a synchronized manner by the carriages 2 over the retractable lattice girders 5 and centered over the vertical of the pit 6. The following figure, FIG. 13, shows how the lifting mechanism has been raised to grab and lift the corresponding tray 1 slightly above where it was supported, and thereby allowing the release of both the retractable lattice girders 5 and the transport carriages 2 mounted thereon. FIG. 14 shows how the retractable lattice girders 5 have been withdrawn on the field side, taking with them the transport carriages 2, so as to offer guidance continuity for the next trays on their path across the support slab 4 towards the pit 6, and to allow clearing the space of the lifting mechanism to be able to start lowering the tray 1 in a synchronized manner by means of the telescopic hydraulic cylinders 15 thereof. FIGS. 15 and 16 show the lowering of the corresponding tray 1 by means of the lifting system 8. Furthermore, FIG. 17 shows how the supporting gussets 18 of the storage system 7 associated with the lowering tray 1 have been deployed in order to leave it stored in its final position in the pit 6. FIG. 18 shows the tray 1 in its storage position, and FIG. 19 shows how the lifting system 8 has continued to be lowered in order to release the recently lowered tray and be ready to rise up and pick up the next tray 1. That release can be seen in FIG. 20, where the supporting gussets 14 of the lifting mechanism have been withdrawn to allow the rising up of the lifting system 8 without interfering with the previously stored trays 1. FIG. 21 shows how the lifting mechanism has been lifted above the last stored tray and is going to pick up the next one. The process is repeated sequentially until all the trays 1 are stored. Furthermore, the folding bleachers 9 are lastly lowered to their stable standby position, so as to render the infrastructure ready for any other type of event, as sequentially shown in FIGS. 22 and 23, while the natural or artificial turf is stored, cared for, and maintained in the pit 6, being controlled at all times and protected against the weather and/or any damage that the event in question may cause had it been left out.

Figure 24:
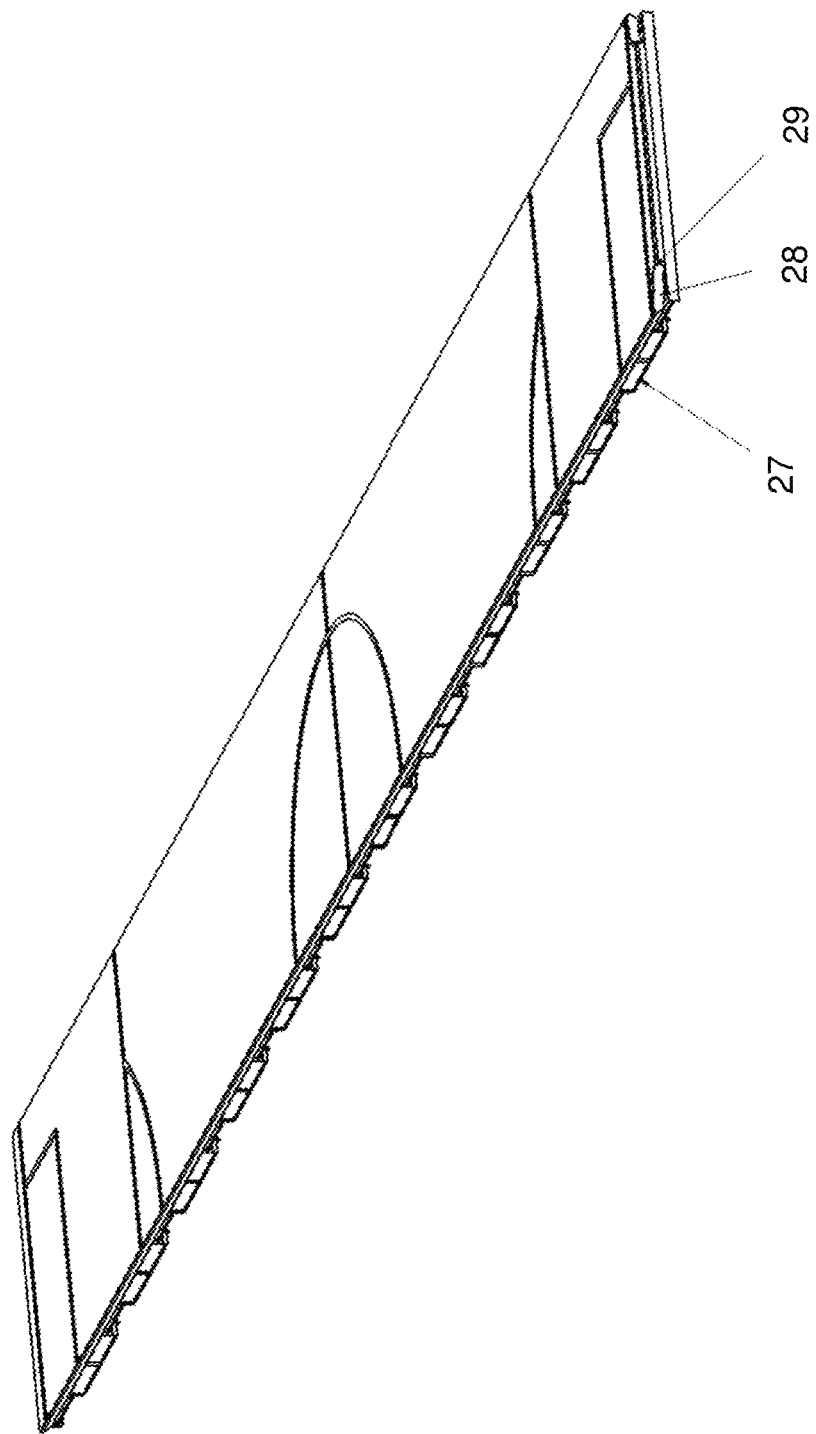
FIGS. 24 and 25 show, in detail, one of the trays forming the playing field by means of bands, with all the main parts, that is, self-supporting metallic structure, layers of the field, and natural or artificial turf, etc.
Figure 25:
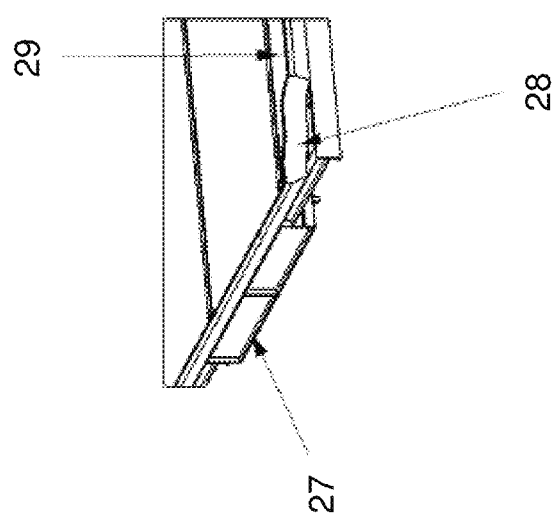

The following Figures show in detail some of the main components of the invention. FIGS. 24 and 25, the latter in detail, show one of the trays 1 forming the bands of the playing field, with their main parts, their self-supporting metallic structure 27, and the layers of the field 28, culminating in usually natural turf 29.

Figure 26:
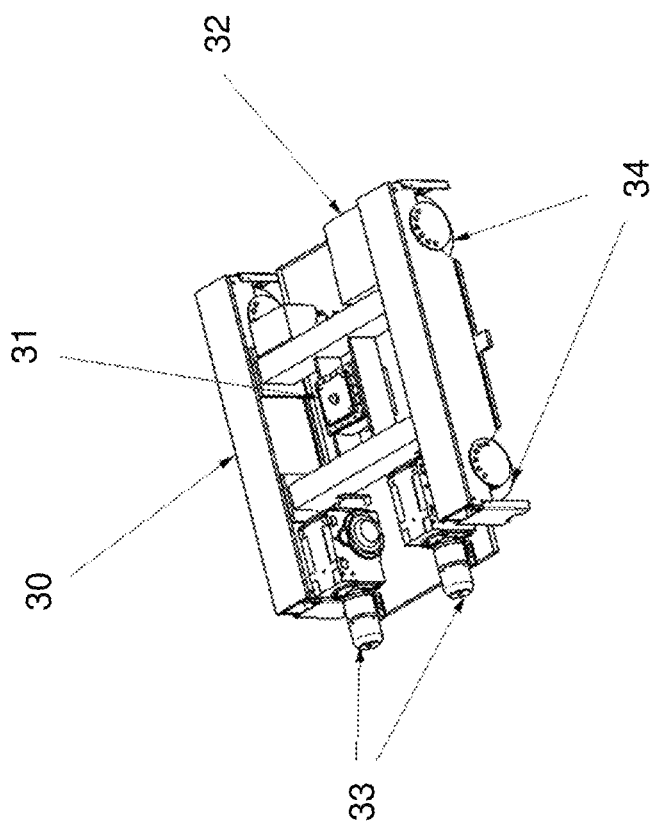
FIGS. 26 to 28 respectively show the master transport carriage, the slave transport carriage, and the configuration of the assembly between them, mechanically linked to one another, in a preferred embodiment thereof.
Figure 27:
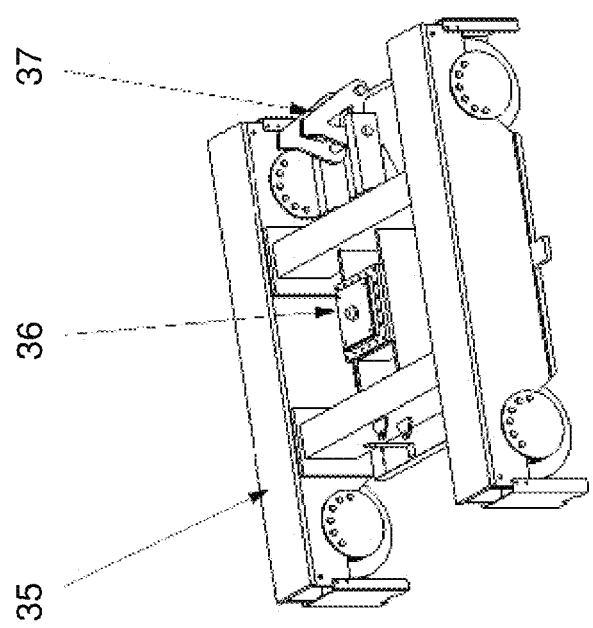
Figure 28:
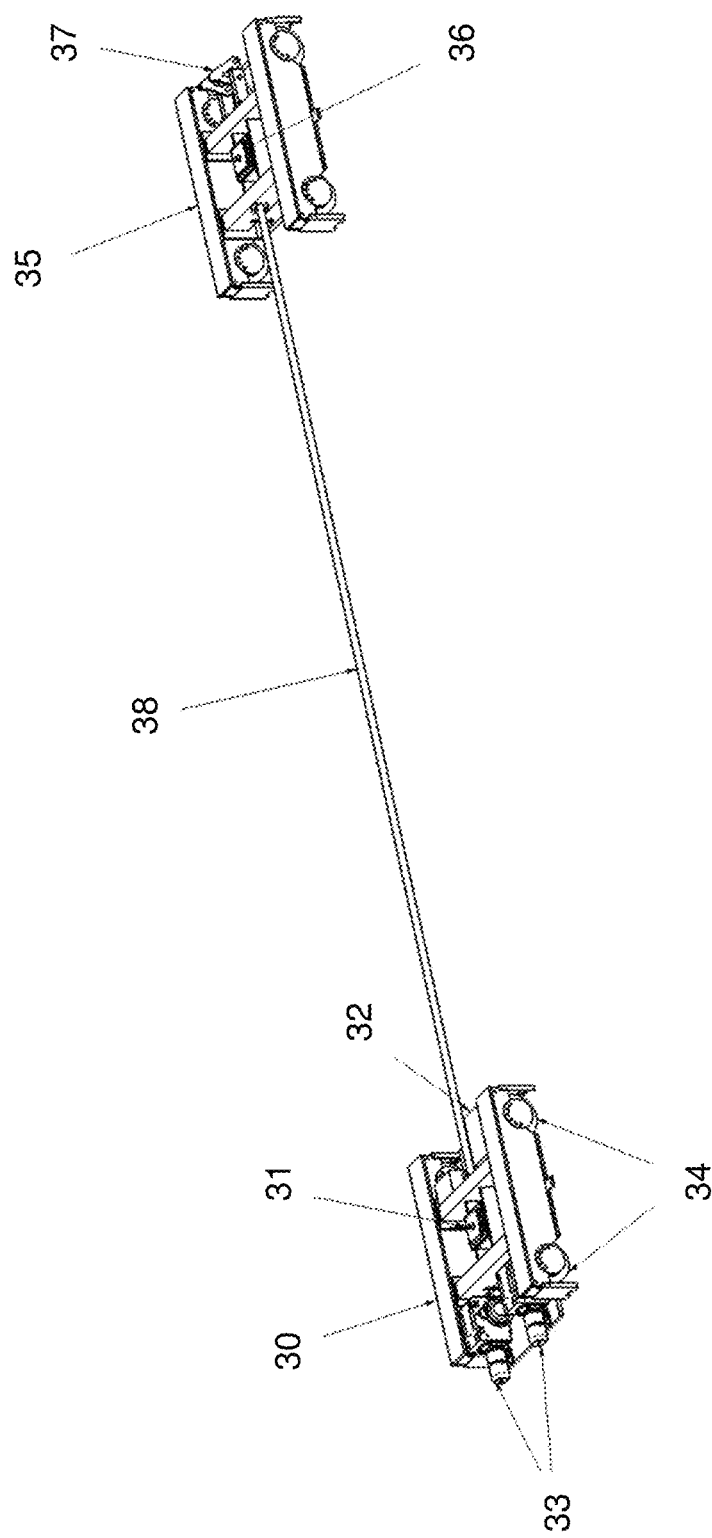

The transport carriages 2 are shown in FIGS. 26 to 28 according to a preferred embodiment of this invention, with the master transport carriage being shown in FIG. 26, the slave transport carriage being shown in FIG. 27, and the configuration of the assembly between them, mechanically linked to one another, being shown in FIG. 28. FIG. 26 indicates the most relevant components of the master transport carriage, which are the bearing structure 30, the tray lifting system 31, the hydraulic set 32, the electromechanical geared motors 33, and the guide wheels 34. FIG. 27 indicates the most relevant components of the slave transport carriage, that is, the bearing structure 35, the tray lifting system 36, and the tray joint closing mechanism 37. Furthermore, FIG. 28 shows an assembly of master carriage plus slave carriage mechanically linked to one another by means of the mechanical securing system 38.

Figure 29:
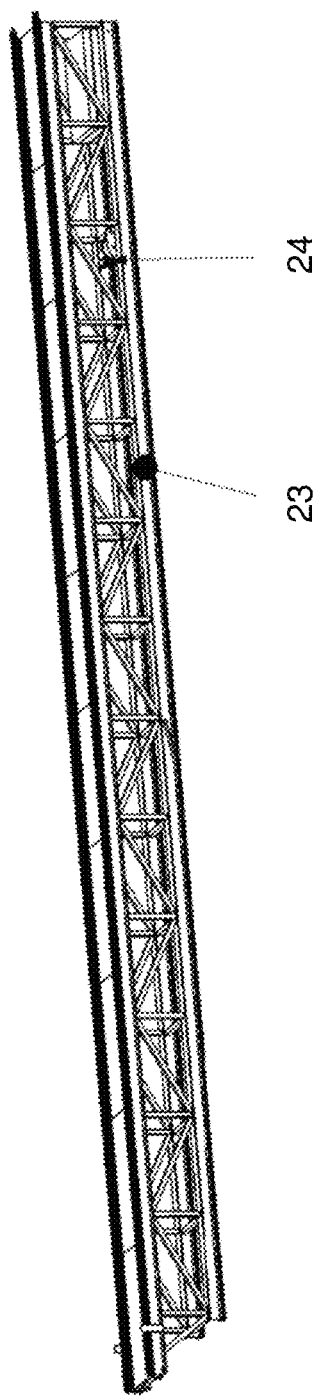
FIG. 29 shows the retractable lattice girder in a preferred embodiment, being of a length that is about twice the width of the pit.

FIG. 29 shows the retractable lattice girder 5 in a preferred embodiment, being of a length that is about twice the width of the pit. Standing out therein are the metallic bearing structure 23 and the actuation system 24 thereof, this being by means of a geared motor and chain or belt in a preferred embodiment. This lattice girder configuration, having a double length, offers the advantages of allowing the simplification of the entire rolling of the retractable lattice girder 5 when it enters the pit 6 on only the supporting face of the lattice girder over the slab 4; and it furthermore simplifies the translational movement of the transport carriages 2 to a single guidance, the retractable lattice girder 5 providing continuity to the guidance within the support slab 4, in the entire range of movement required of the transport carriages 2.

Figure 30:
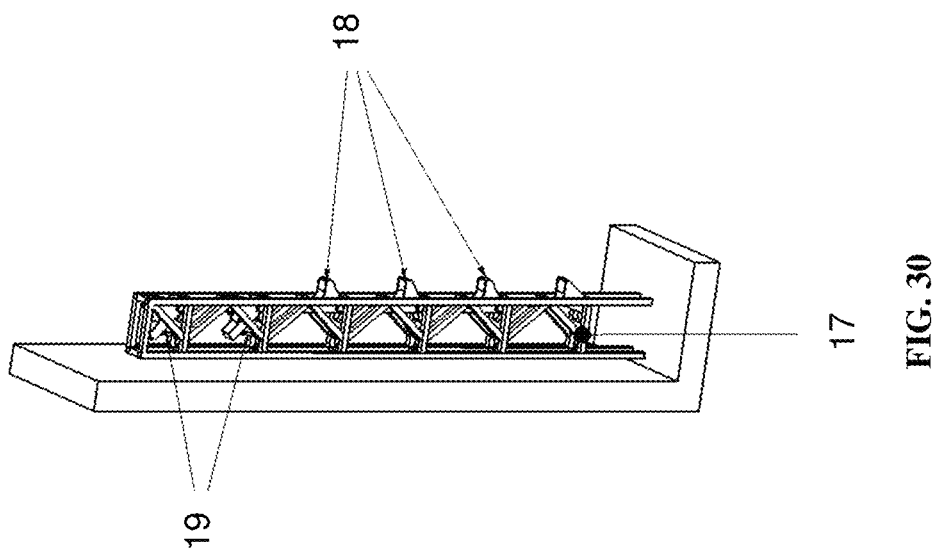
FIGS. 30 and 31 depict in further detail the main elements of both the storage system and of the lifting system, respectively.
Figure 31:
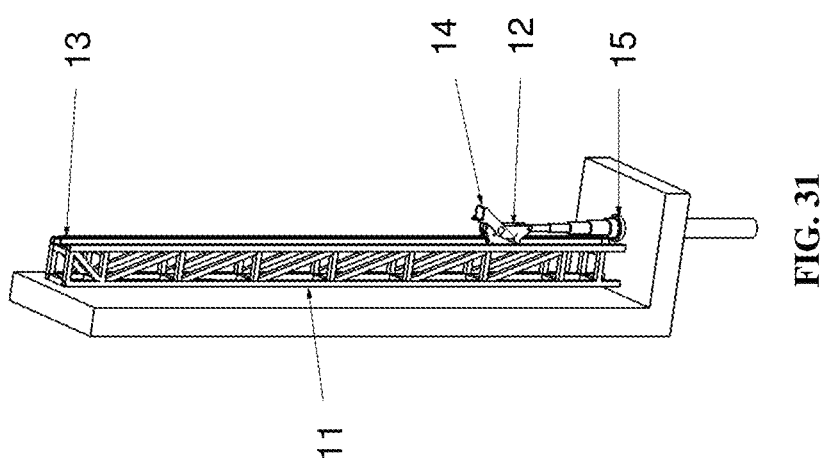

FIGS. 30 and 31 depict in further detail the main elements of both the storage system 7 and the lifting system 8, respectively. FIG. 30 shows the bearing structure 17 of the storage system, configured by means of metallic columns anchored or not to the two side walls of the pit 6, the supporting gussets 18 of the storage system, and the preferably pneumatic actuation of the supports of the storage system 7. FIG. 31 shows the columns 11 of the lifting system 8, configured by means of metallic columns also anchored or not to the two side walls of the pit 6, the runners 12 of the lifting system 8, which are fixed at the ends of the telescopic hydraulic cylinders 15 and guided along the entire path thereof through the guides 13, and the supporting gussets 14 of the lifting system 8, preferably pneumatically actuated.

Figure 32:
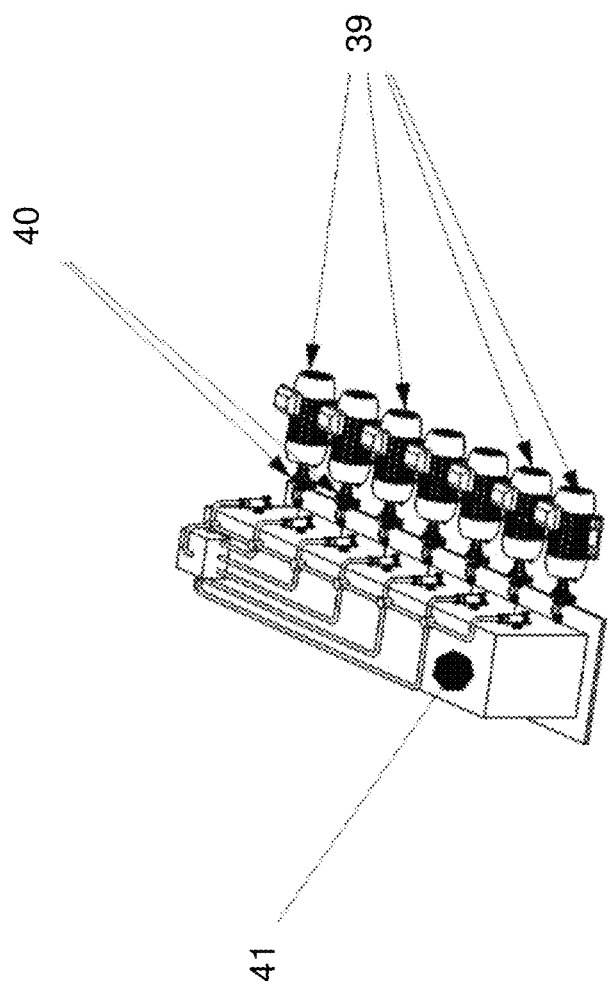
FIG. 32 shows the main components of the hydraulic set powering both the lifting system and the folding bleachers, should the latter be required.
Figure 33:
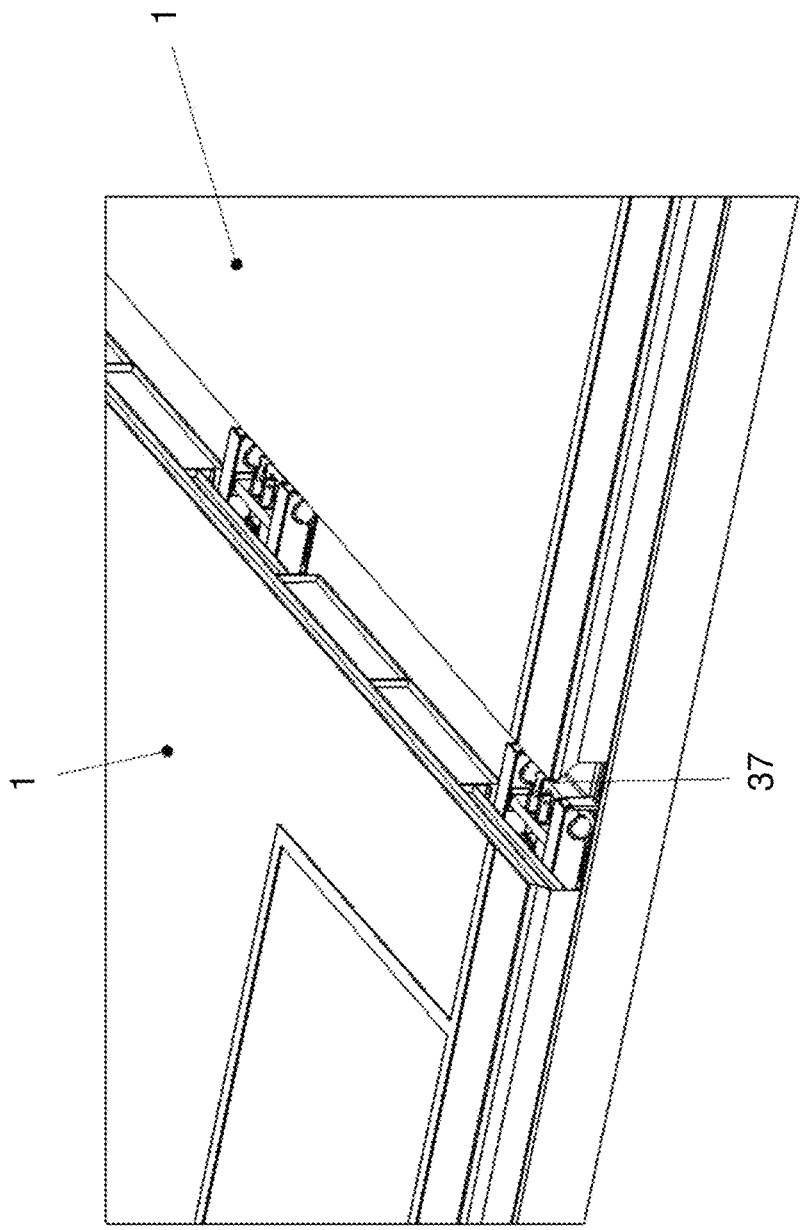
FIGS. 33 to 40 schematically show the sequence for closing the joint between a tray and the preceding tray placed in position, when the playing field is being taken out by means of the system object of this invention.
Figure 34:
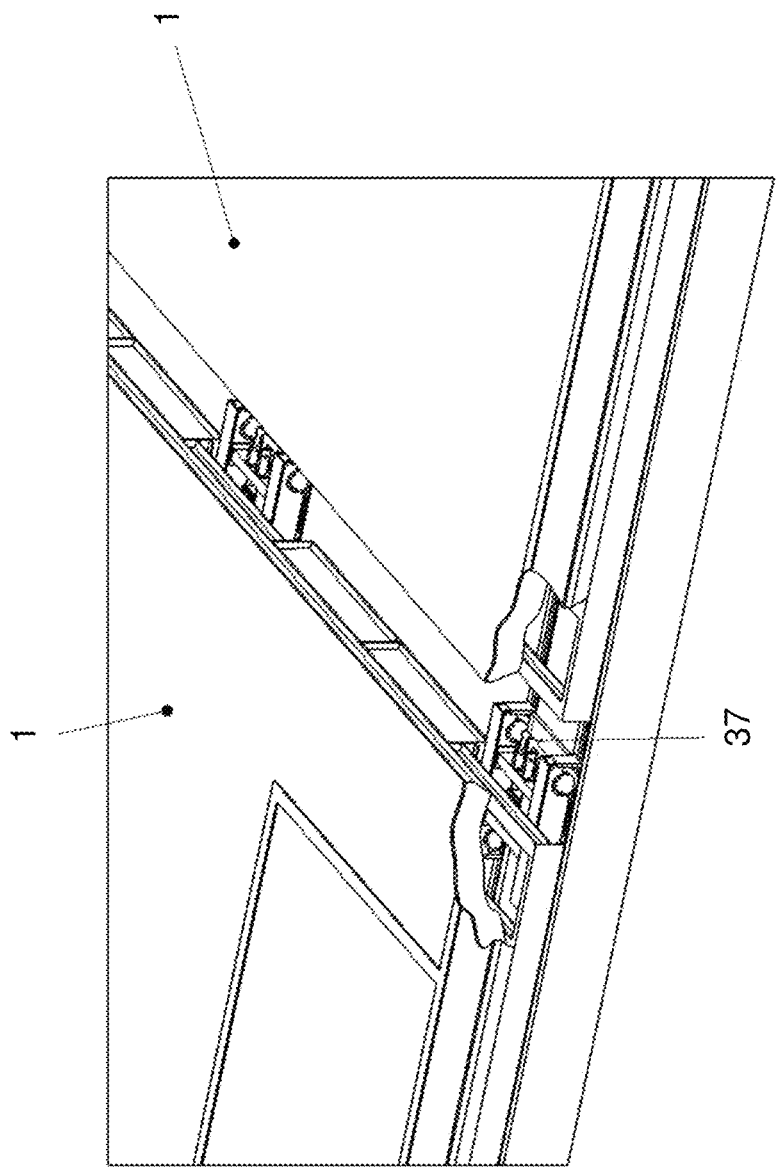
Figure 35:
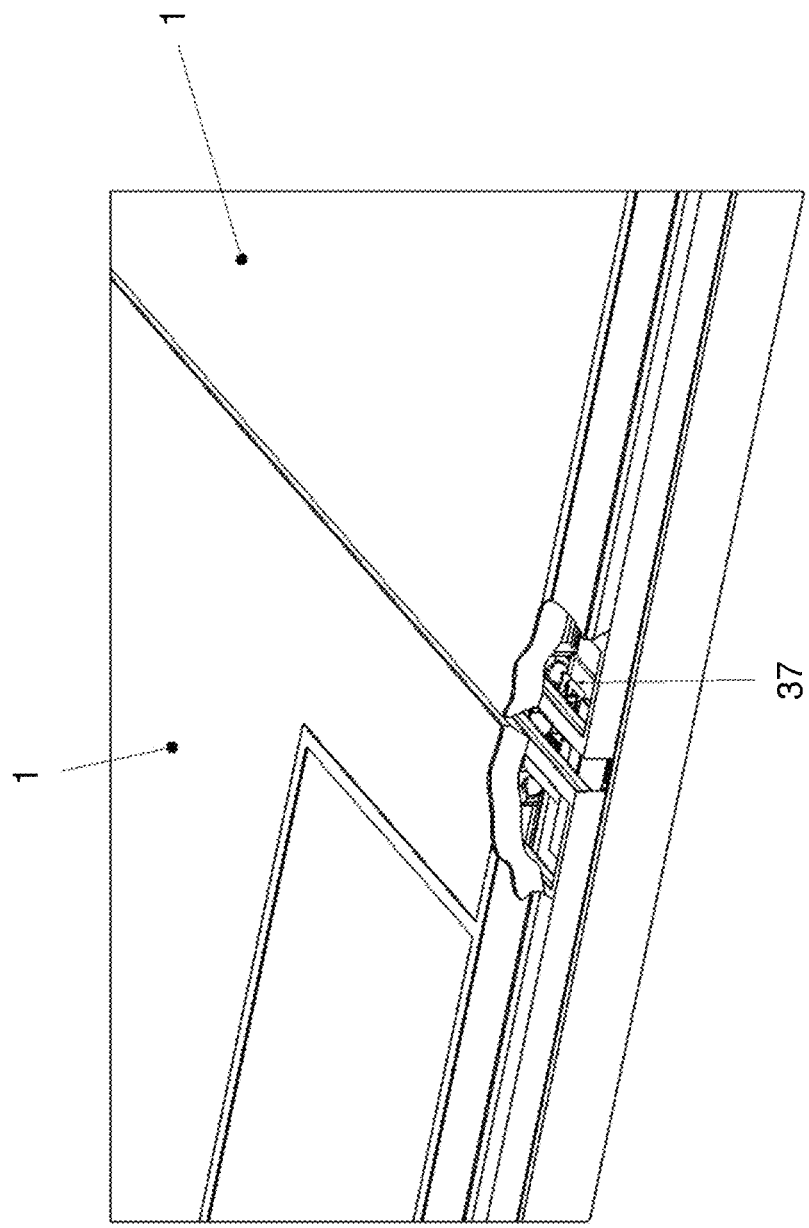
Figure 36:
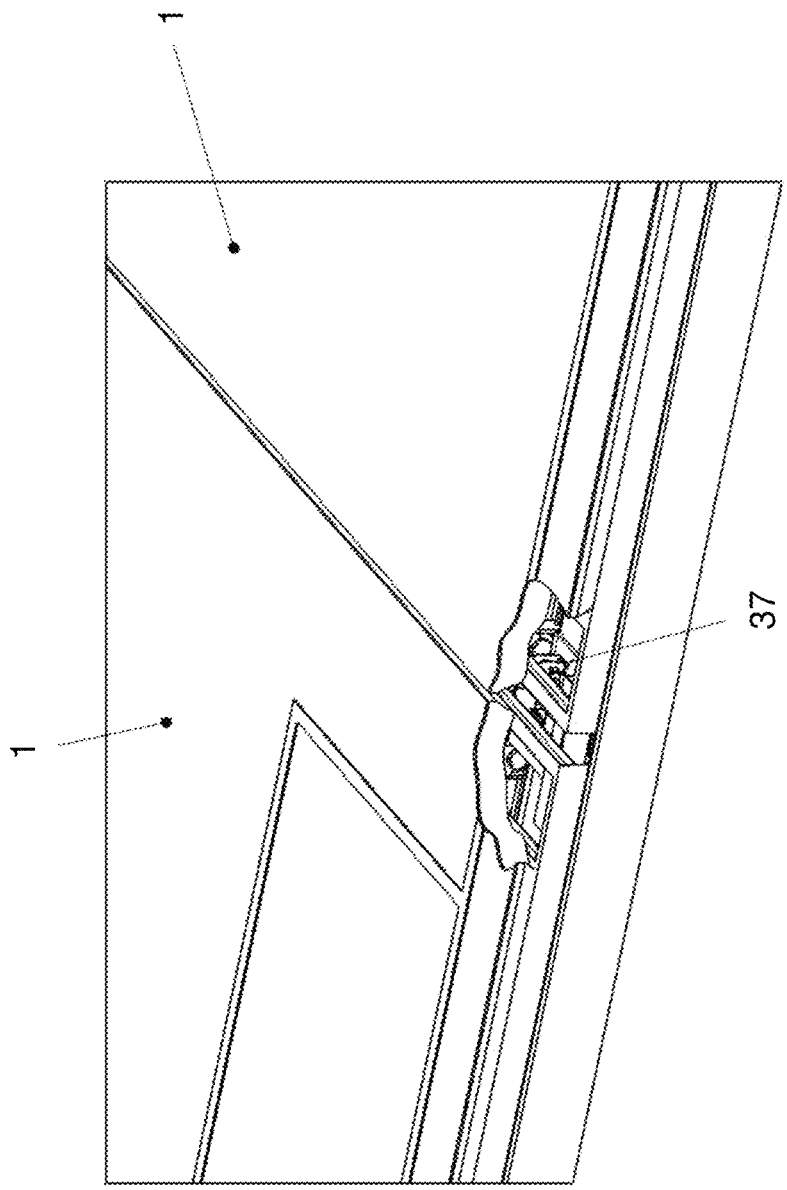
Figure 37:
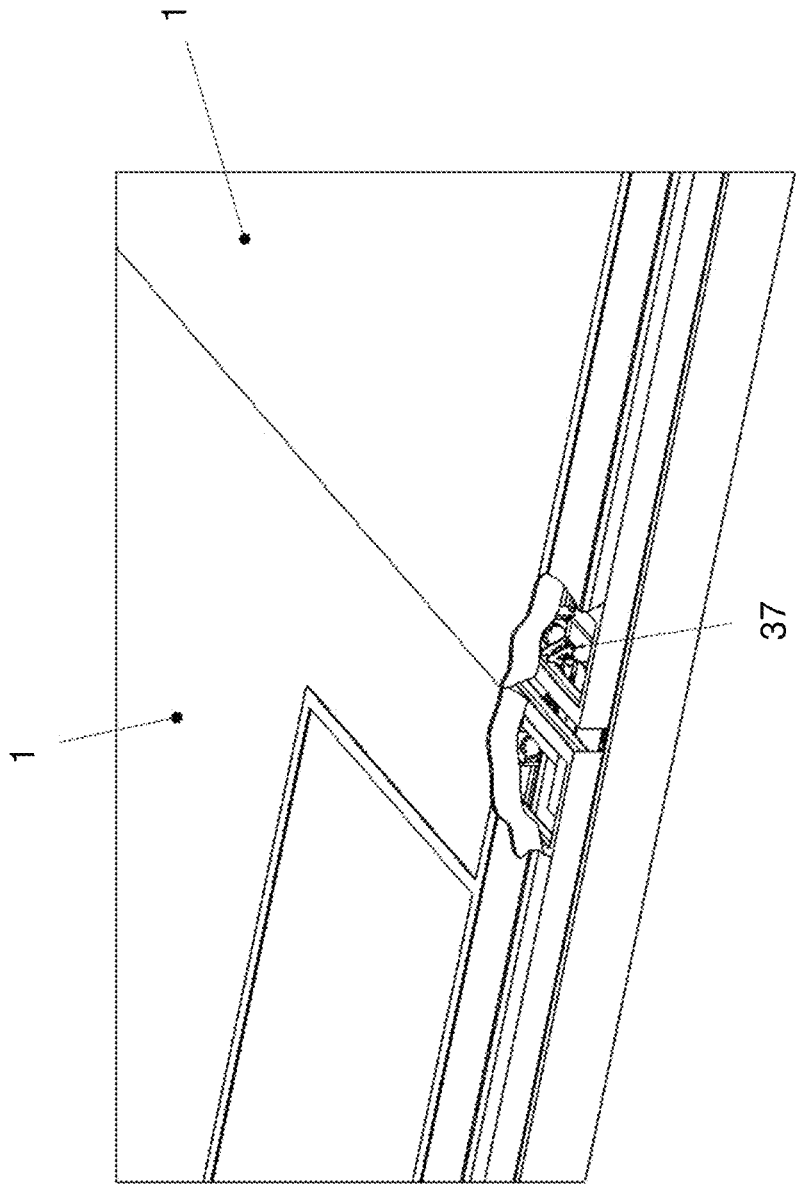
Figure 38:
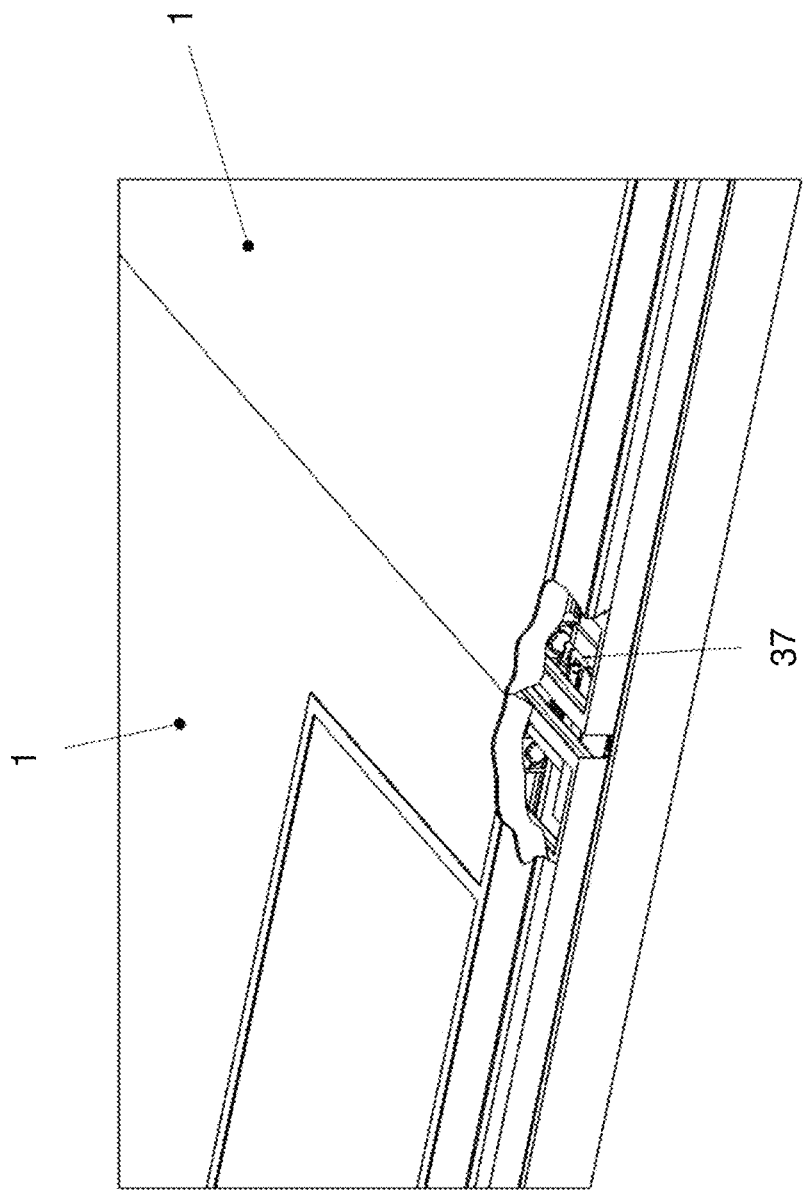
Figure 39:
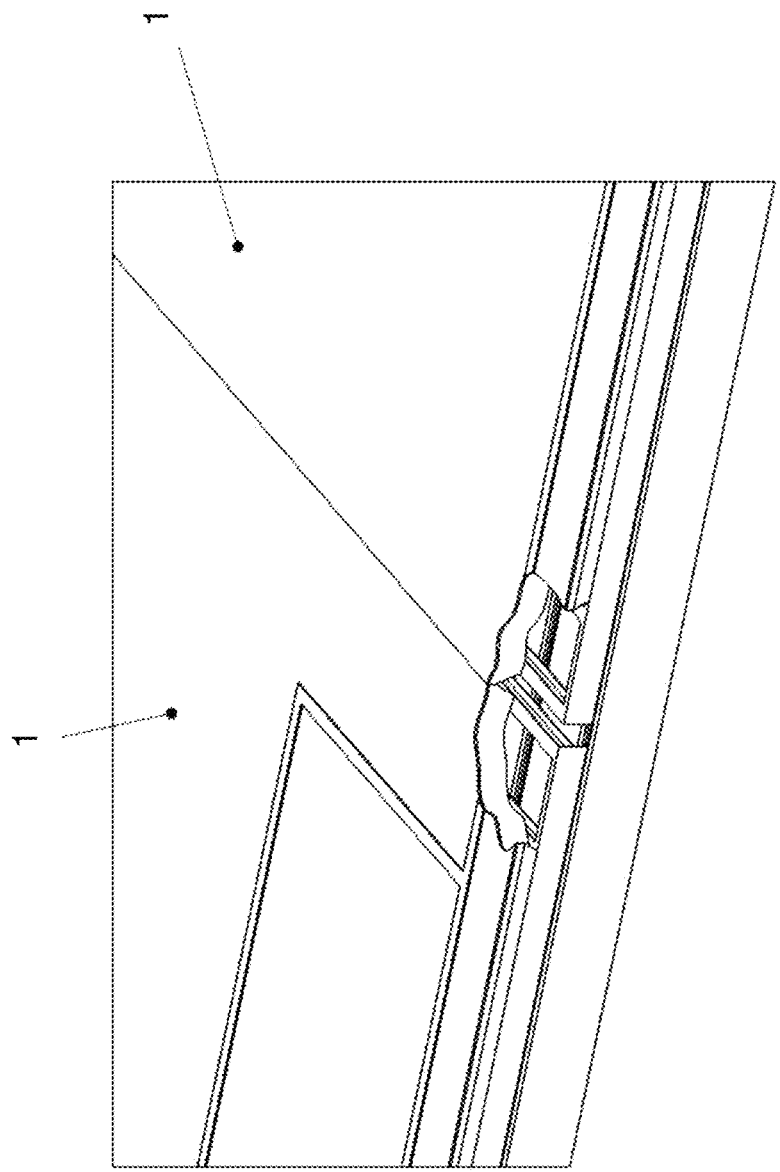
Figure 40:
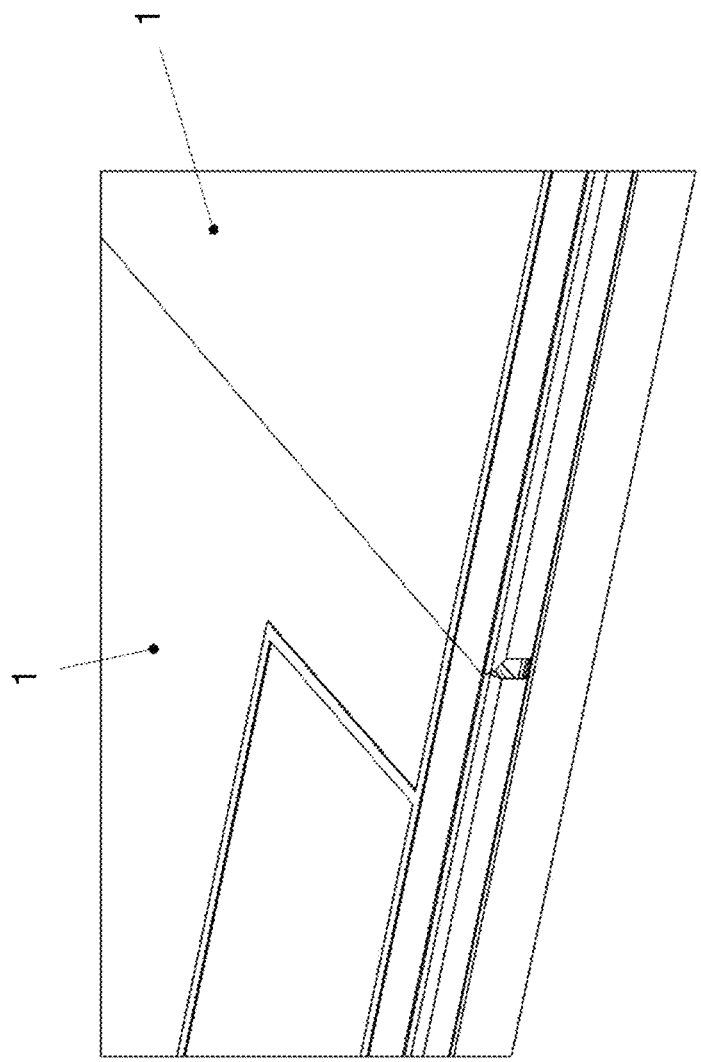

FIG. 32 shows the main components of each of the hydraulic sets powering both the lifting system 8 and the folding bleachers 9, if required. These are the electric motors 39, the feed pumps 40, and the tank 41 of each of the hydraulic sets required for feeding all those systems.

The tray joint closing mechanism 37 of each of the slave transport carriages, always on the side farthest away from the pit 6, is functionally described in FIGS. 33 to 40, which schematically show the sequence for closing the joint between one tray and the preceding tray previously placed in position, when the playing field is being taken out by means of the system object of this invention. This hydraulically actuated tray joint closing mechanism 37 is based on a claw concept which in each slave transport carriage drives the corresponding tray closer until closing the joint with the preceding tray, already in the fixed position due to its own weight on the support slab 4, until achieving a contact pressure on the joint equivalent to the cohesion of natural turf fields, and thus generating continuity of the field.

Figure 41:
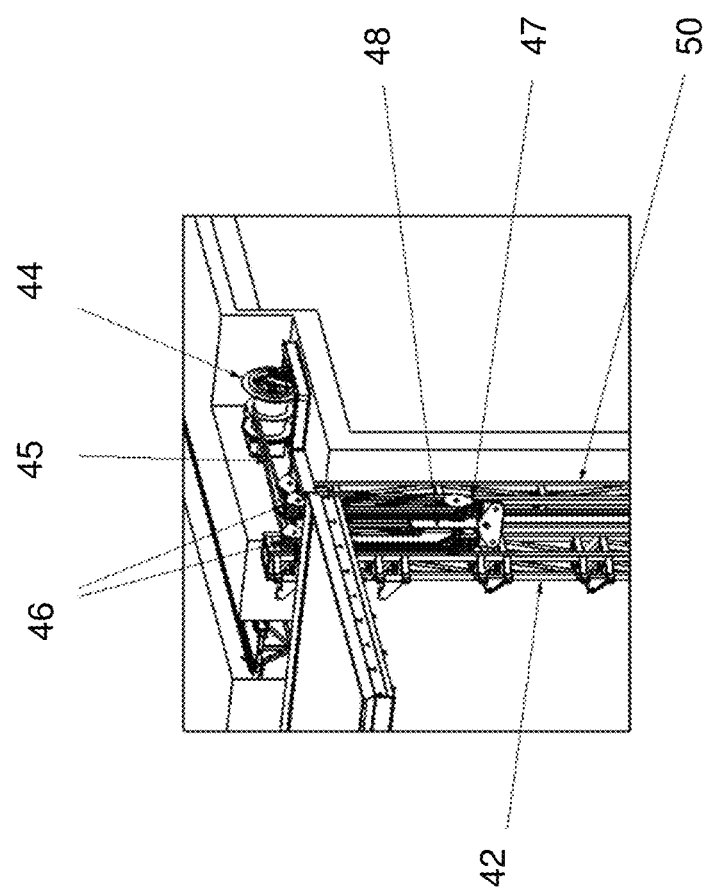
FIGS. 41 to 50 show different alternatives to the preferred invention.
Figure 42:
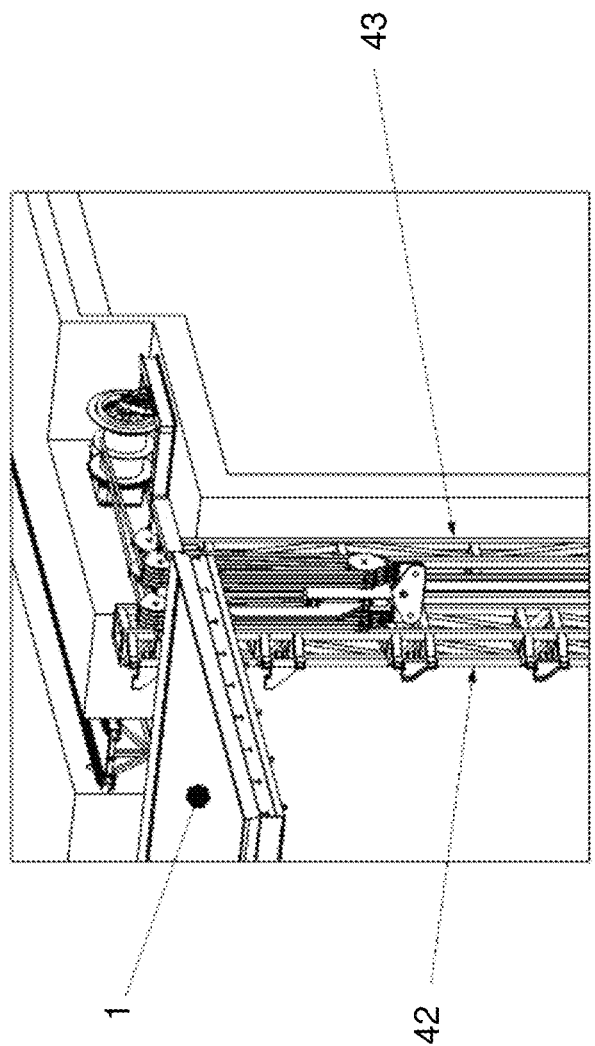
Figure 43:
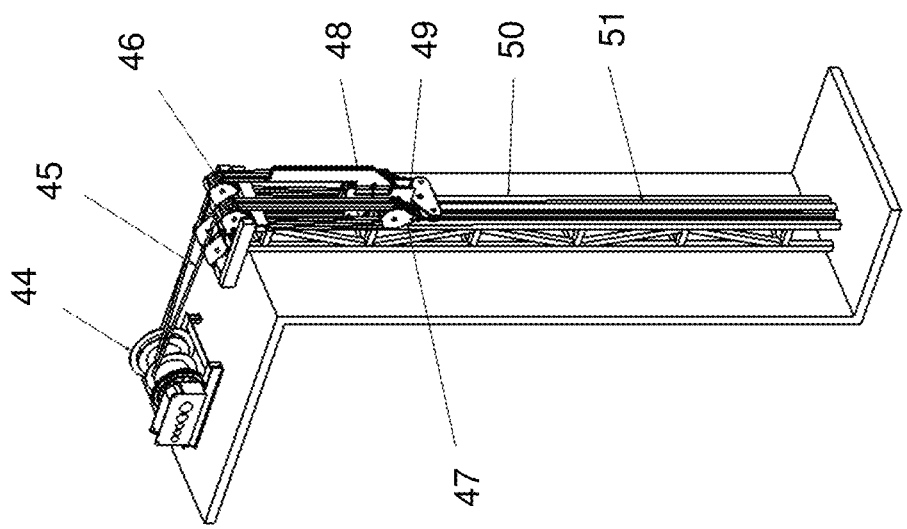

In a preferred embodiment, the lifting system 8 will be hydraulic but it also can be based on cables and winches in another embodiment of the invention, as is shown in FIGS. 41 to 43. These figures show the main elements of this alternative lifting system 43. It consists of a drum 44, cable 45, upper pulleys 46 and lower pulleys 47, supporting gussets 48, runner 49, bearing structure 50 based on metallic columns, and guide 51 for making the entire useful path of the lifting mechanism reliable, with all of it being functionally equivalent to the hydraulic embodiment of reference.

Figure 44:
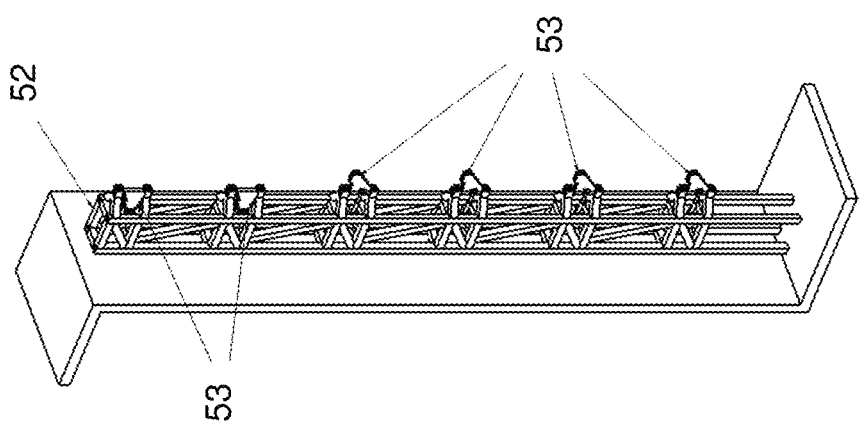

FIG. 44 shows an alternative for the storage system 7, in this case with a supporting gusset with horizontal movement rotating about a vertical shaft for the storage system. This storage system 42 with horizontal gussets would have a bearing structure 52 also based on metallic columns anchored or not to the walls of the pit 6 and they would have the supporting gussets 53.

Figure 45:
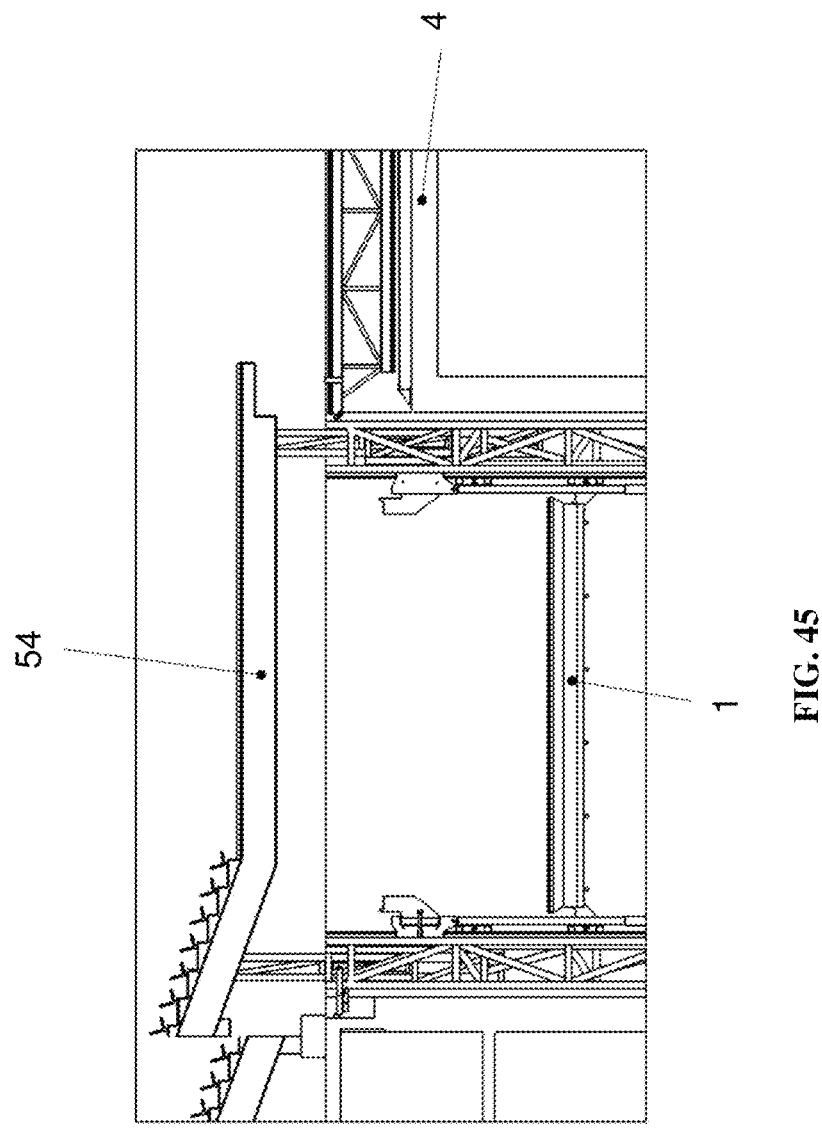
Figure 46:
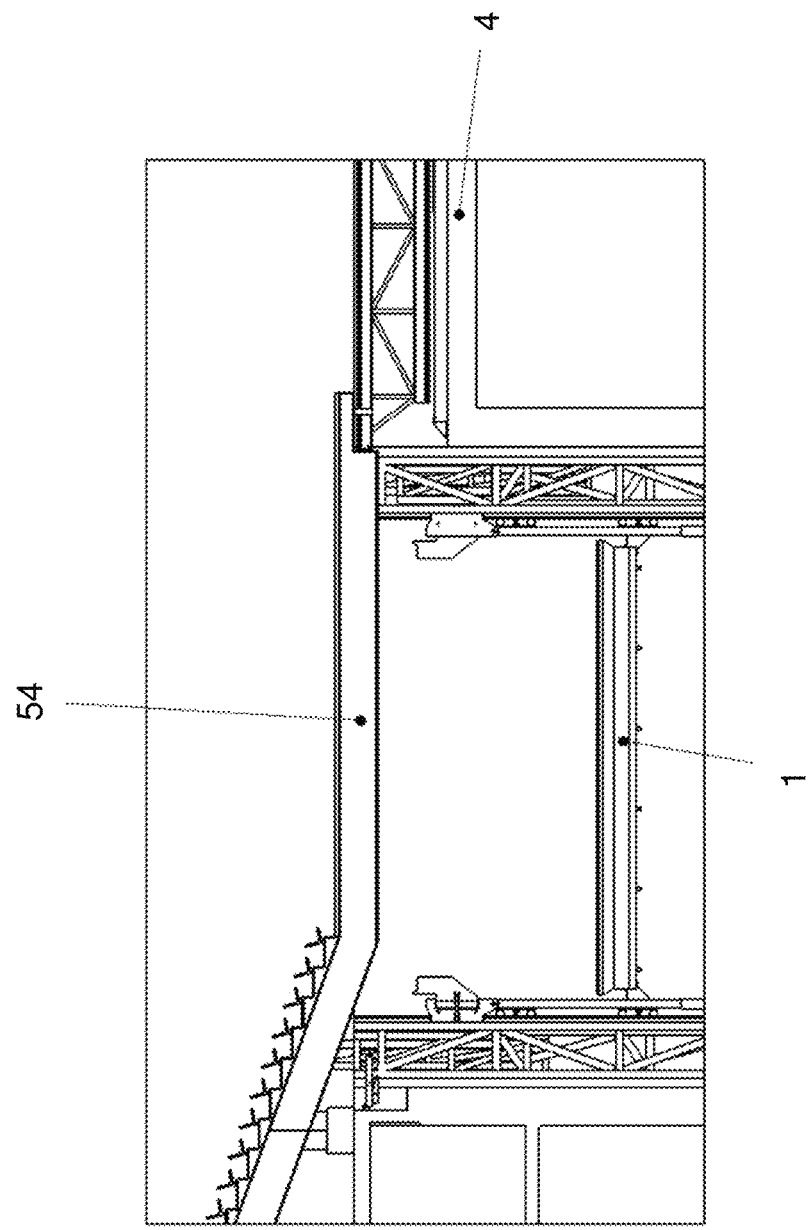
Figure 47:
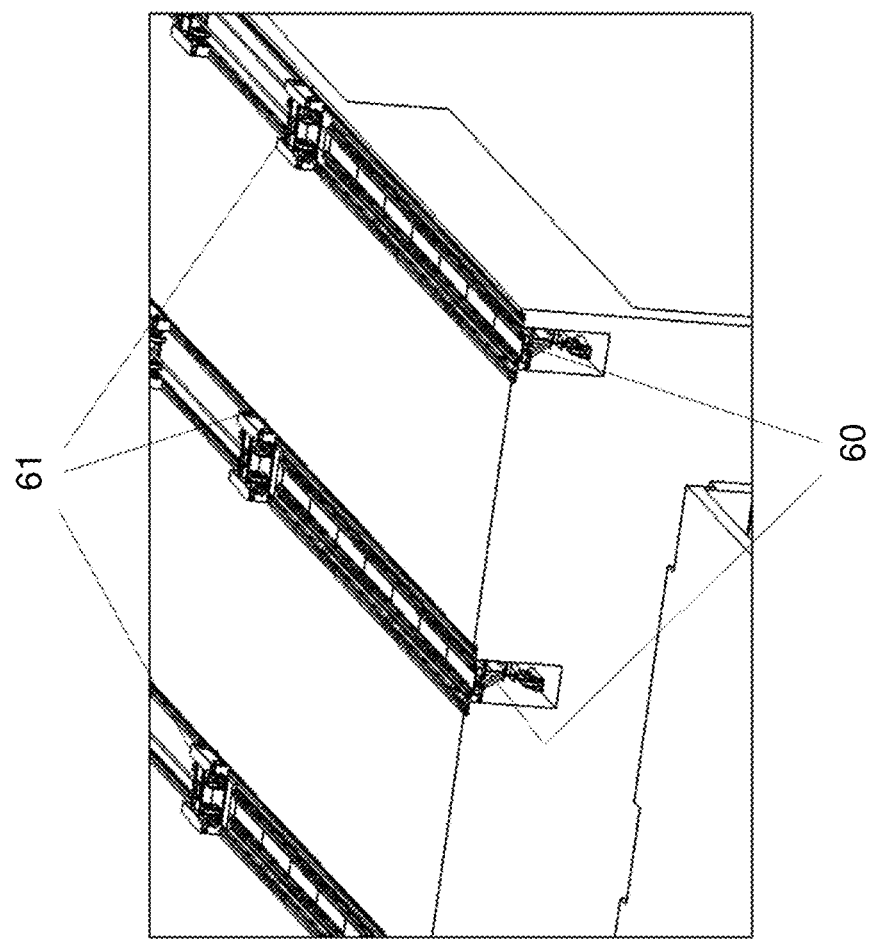
Figure 48:
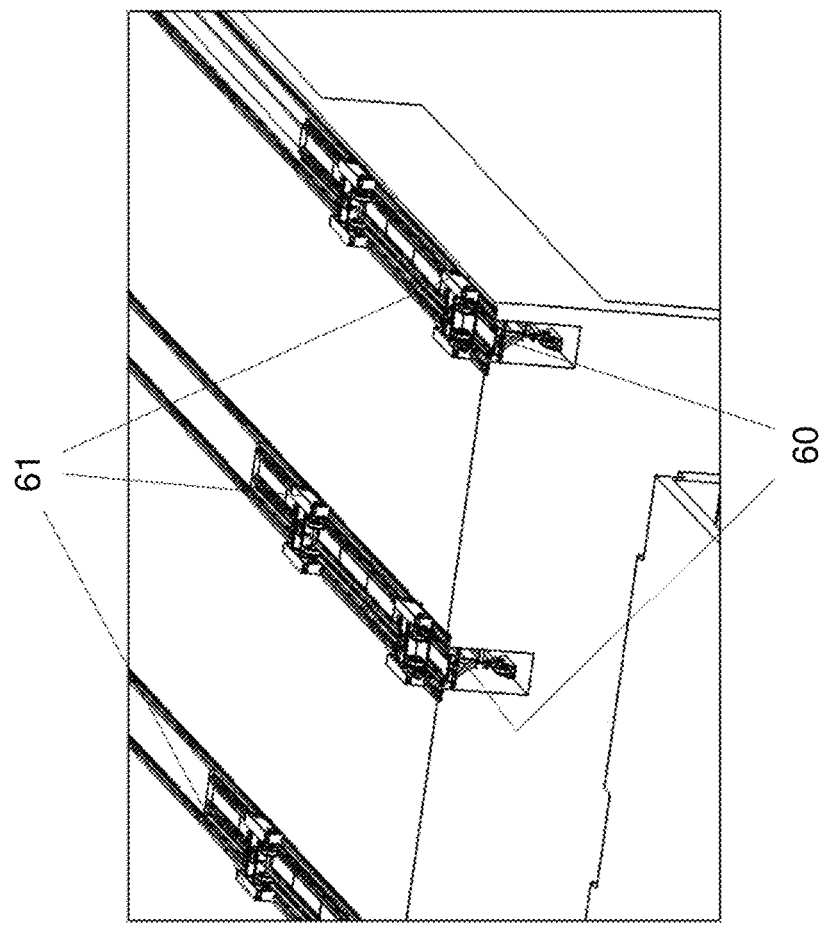
Figure 49:
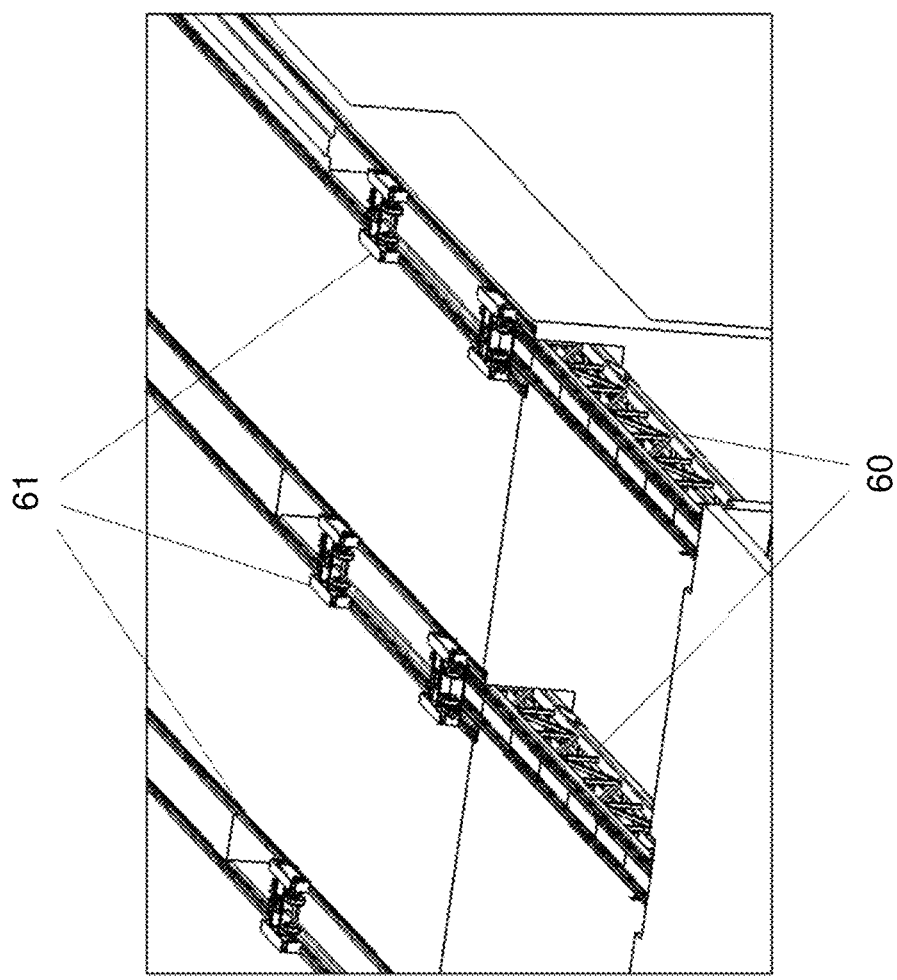
Figure 50:
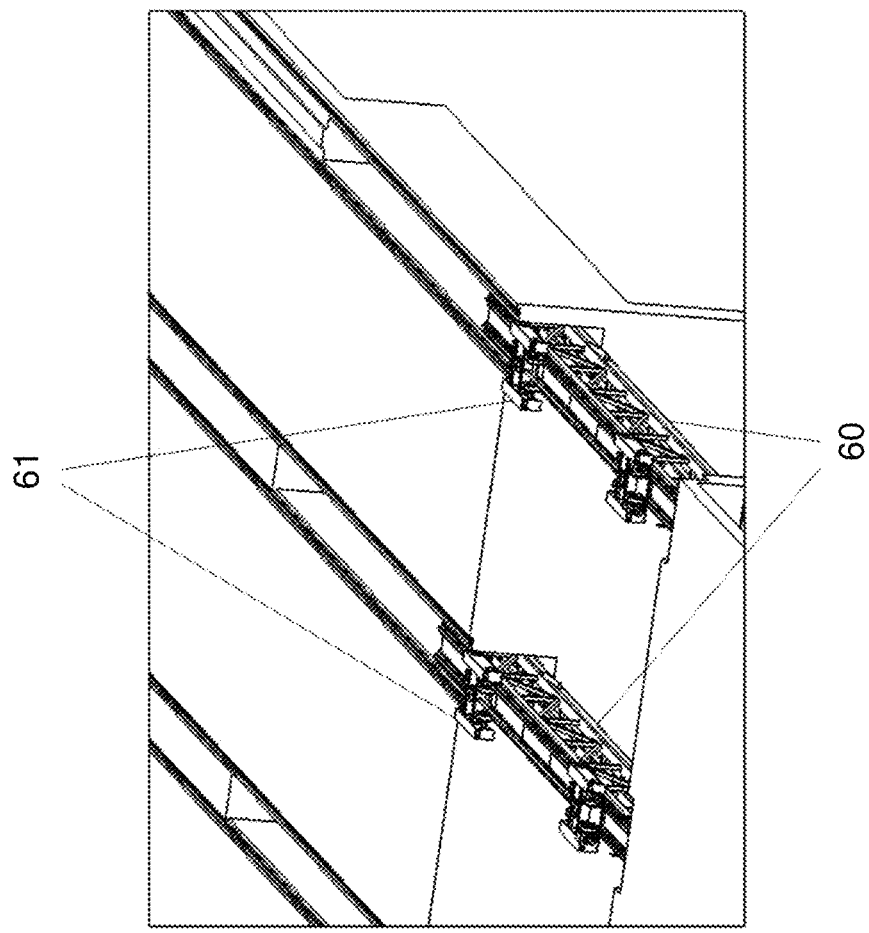

In another embodiment of the invention, FIGS. 45 and 46 show an alternative to the preferred folding bleacher solution, in this case a liftable bleacher 54 with vertical rather than rotational movement capacity with respect to a rotating shaft.

Furthermore, FIGS. 47 to 50 show another configuration of retractable lattice girders 60, these retractable lattice girders 60 being shorter, having a length only slightly greater than the width of the pit, but requiring double rolling for the lattice girder, and transport carriages 61 with double guidance and a double wheel, the first for being moved across the support slab 4, and the second for being moved over the retractable lattice girders 60 when the latter are deployed over the pit 6.

Both the mentioned embodiments for the retractable lattice girders 5 or 60 focus on the lattice girders being located on the field side and extending over the pit 6 towards the bleacher side, all for the purpose of not affecting the bleachers or affecting them as little as possible, or on there not being sufficient space, even where a side bleacher must be rebuilt, below that bleacher for installing the retractable lattice girders on the bleacher side. If all these limitations could be overcome, another embodiment of the invention is to build the retractable lattice girders 5 or 60, but on the bleacher side, which allows simplifying the system and the movements of the transport carriages 2 and eliminating the gaps to be made in the support slab 4 for housing the lattice girders on the field side, as well as the double guidance in the transport carriages 2 in the event of implementing retractable lattice girders 60 having a smaller length.

Having clearly described the invention, it is hereby stated that the particular embodiments described above may be susceptible to modifications in detail provided that such modifications do not alter the fundamental principle and essence of the invention.

The invention claimed is:

1. A system for reversibly converting stadiums into multifunctional infrastructures by means of removal and storage of a playing field in a pit (6) located parallel to the playing field, the playing field having a plurality of sides, the system comprising:
   an assembly of trays (1) on which the playing field is located, wherein each of the trays of the assembly of trays (1):
   is movable from or towards the pit (6);
   has a length equal to a total length of the playing field in a longitudinal direction of the pit (6);
   is self-supporting; and
   houses layers of the playing field and natural or artificial turf;
   a transport system for guided hoisting and transverse horizontal shifting of each tray of the assembly of trays (1), and configured to move each tray of the assembly of trays from a position on the playing field to a vertical position in the pit (6);
   an assembly of retractable lattice girders (5) comprising a plurality of retractable lattice girders, configured for being deployed over the pit (6);
   a lifting system (8) installed in the pit (6) configured for lowering vertically each tray of the assembly of trays to a final storage position, or lifting each tray of the assembly of trays from the final storage position;
   a storage system (7) installed in the pit (6) for storing each tray of the assembly of trays,
   wherein the transport system is a horizontal transport system comprising an assembly of autonomous transport carriages (2) comprising a plurality of transport carriages, guided by means of a system selected from rails or an inductive guidance system in a support slab (4), for transversely transporting each tray of the assembly of trays wherein the plurality of transport carriages (2) comprises a quantity of between ten and twenty-two transport carriages for supporting each tray (1) when each tray of the assembly of trays (1) when each tray of the assembly of trays is configured in a longitudinal direction of the playing field; and wherein the plurality of transport carriages (2) comprises a quantity of between four and twelve transport carriages for supporting each tray of the assembly of trays when each tray of the assembly of trays is configured in a transverse direction of the playing field; and wherein a number and a position of the plurality of retractable lattice girders (5) of the assembly of retractable lattice girders coincide with a number and a position of the plurality of transport carriages of the assembly of autonomous transport carriages (2).

2. The system for reversibly converting stadiums into multifunctional infrastructures according to claim 1, wherein the pit (6) is located on one of the plurality of sides of the playing field.

3. The system for reversibly converting stadiums into multifunctional infrastructures according to claim 1, wherein the pit (6) comprises installations, accesses, and a depth for storing each tray of the assembly of trays (1) with a vertical separation between each tray of the assembly of trays of not less than 2 m.

4. The system for reversibly converting stadiums into multifunctional infrastructures according to claim 1, wherein the assembly of trays (1) comprises a quantity of between five and eight trays, and when the assembly of trays are configured in the longitudinal direction of the playing field, each tray of the assembly of trays is up to 144 m long by between 9 and 12 m wide, respectively.

5. The system for reversibly converting stadiums into multifunctional infrastructures according to claim 1, wherein the assembly of trays (1) comprises between eight and fourteen trays, and when the assembly of trays (1) are configured in the transverse direction of the playing field, each tray of the assembly of trays is up to 70 m long by between 8 and 13 m wide, respectively.

6. The system for reversibly converting stadiums into multifunctional infrastructures according to claim 1, further comprising a system of folding bleachers (9) to allow the assembly of trays (1) to be introduced in the storage system (7) of the pit (6) configured for being folded over the pit (6), the pit (6) being covered and closed.

7. The system for reversibly converting stadiums into multifunctional infrastructures according to claim 1, wherein each of the plurality of transport carriages (2) is
   subdivided into a motorized master transport carriage, and
      a slave transport carriage, mechanically linked to one another, wherein the master transport carriage (2) comprises a bearing structure (30), a tray lifting system (31), a hydraulic set (32), electromechanical geared motors (33), and guide wheels (34); and wherein the slave transport carriage comprises a bearing structure (35), a tray lifting system (36), and a tray joint closing mechanism (37); wherein the master transport carriage and the slave transport carriage are attached by means of a mechanical securing system (38).

8. The system for reversibly converting stadiums into multifunctional infrastructures according to claim 1, wherein the transport system comprises individual motorizations in each tray of the assembly of trays (1) to enable performing the synchronized horizontal translational movement thereof.

9. The system for reversibly converting stadiums into multifunctional infrastructures according to claim 1, wherein the assembly of autonomous transport carriages (2) carries instruments and control system so that both the translational movement and the lifting movement are synchronized among each of the transport carriages of the assembly of autonomous transport carriages (2) of the system, to respectively enable shifting and hoisting each tray of the assembly of trays (1) safely.

10. The system for reversibly converting stadiums into multifunctional infrastructures according to claim 1, wherein the assembly of retractable lattice girders (5) are of a length that is about twice a width of the pit (6) in order to allow a rolling thereof to take place only on the support slab (4), the assembly of retractable lattice girders are counterweighted so that assembly of retractable lattice girders can enter and exit the pit (6), without requiring double rolling, wherein each retractable lattice girder (5) of the plurality of retractable lattice girders comprises a metallic bearing structure (23), a guidance system (25) by means of dual wheels with distribution equalizers, centering systems, with receiving and securing systems (26).

11. The system for reversibly converting stadiums into multifunctional infrastructures according to claim 1, wherein the assembly of retractable lattice girders (60) comprises a length greater than a width of the pit (6), wherein the assembly of retractable lattice girders (60) are configured to be guided with double rolling to enable safely accessing the pit; and when the assembly of retractable lattice girders (60) are located on one of the plurality of sides of the playing field, the assembly of retractable lattice girders (60) are embedded in the support slab (4), and enter over the pit (6) towards a bleacher side; the assembly of retractable lattice girders further comprises transport carriages of the plurality of transport carriages with double guidance (61) comprising a first guidance and a second guidance, the first guidance configured to be moved over the lattice girder, and the second guidance configured to be moved over the support slab (4) so that the double guidance can move when the assembly of retractable lattice girder (60) is deployed over the pit (6), and the plurality of transport carriages with the double guidance (61) go back to pick up each tray of the assembly of trays (1) again.

12. The system for reversibly converting stadiums into multifunctional infrastructures according to claim 11, wherein the assembly of retractable lattice girders (5) is located on the bleacher side and extend over the pit (6) towards one of the plurality of sides of the playing field.

13. The system for reversibly converting stadiums into multifunctional infrastructures according to claim 1, wherein the lifting system (8) is hydraulic comprising an assembly of telescopic hydraulic cylinders (15), the assembly of telescopic hydraulic cylinders comprising a runner (12) and a guide (13), on as many columns (11) as telescopic hydraulic cylinders (15); the runner (12) has a double wheel for two-way loading and with distribution equalizers, and wherein the runner (12) has a supporting gusset (14) for picking up each tray of the assembly trays (1), and is configured to be actuated by means selected from a pneumatic and an electromechanical system; wherein the lifting system is configured to move in a synchronized manner both in a load and in a position, powered by several hydraulic sets (16), each of the several hydraulic sets having a tank (41), feed pumps (40), and electric motors (39); wherein the lifting system (8) comprises a common collector configured for preventing malfunctions, both in the feed pumps and the electric motors, and comprises a collector ring between the several hydraulic sets configured for preventing malfunctions in start-up cabinets.

14. The system for reversibly converting stadiums into multifunctional infrastructures according to claim 13, wherein the supporting gussets (14) of the lifting system (8) are deployed and retracted by means of a vertical movement rotating via horizontally arranged shafts.

15. The system for reversibly converting stadiums into multifunctional infrastructures according to claim 13, wherein the supporting gussets (14) of the lifting system (8) are configured for being deployed and retracted by means of a lateral movement rotating via vertically arranged shafts.

16. The system for reversibly converting stadiums into multifunctional infrastructures according to claim 1, wherein the storage system (7) comprises a structure of columns (17), with each of the columns of the structure of columns (17) having an assembly of supporting gussets (18), each of the columns of the structure of columns comprising a number of supporting gussets of the assembly of supporting gussets equal to or greater than a number of the trays of the assembly of trays to be stored (1) there are to be stored, and actuated by means of a system (19) selected from a pneumatic and an electromechanical system.

17. The system for reversibly converting stadiums into multifunctional infrastructures according to claim 16, wherein the supporting gussets (18) of the storage system (7) are deployed and retracted by means of a vertical movement rotating via horizontally arranged shafts.

18. The system for reversibly converting stadiums into multifunctional infrastructures according to claim 16, further comprising a storage system (42) configured by means of a structure of columns (52) having supporting gussets (53) which are deployed and retracted by means of a lateral movement rotating via vertically arranged shafts.

19. A method for reversibly converting stadiums into multifunctional infrastructures using the system of claim 16, comprising:
maneuvering sequentially each tray of the assembly of trays (1), for storing the playing field in the pit (6), starting with a tray of the assembly of trays closest to the pit (6) until a placement of each tray of the assembly of trays (1) in a final storage position, wherein the lifting system (8) is placed on standby with the supporting gussets (14) deployed, and a corresponding tray of the assembly of trays (1) is shifted in a synchronized manner by means of an assembly of transport carriages (2) to an edge of the pit (6), and is lowered in a synchronized manner by means of the lifting system on a support slab (4) for releasing the assembly of retractable lattice girders (5) and the plurality of transport carriages (2) mounted thereon;
deploying the assembly of retractable lattice girders (5) over the pit (6), wherein the plurality of transport carriages of the assembly of transport carriages (2) go back to find each tray of the assembly of trays, each of the transport carriages of the assembly of transport carriages positions and hoists a tray of the assembly of trays in a synchronized manner by means of tray lifting systems; and transporting each tray of the assembly of trays in a synchronized manner over the assembly of retractable lattice girders (5) until centering each tray of the assembly of trays over the pit (6);

moving the lifting system (8) up to grab each tray of the assembly of trays (1), and lowering each tray of the assembly of trays to the pit releasing both the assembly of retractable lattice girders (5) and the plurality of transport carriages (2) mounted on each tray of the assembly of trays; the assembly of retractable lattice girders (5) are withdrawn, taking the plurality of transport carriages (2), and continue for a next tray of the assembly of trays across the support slab (4) towards the pit (6), and so as to allow freeing a space of the lifting system (8) to be able to start lowering each tray of the assembly of trays (1) in a synchronized manner by means of telescopic hydraulic cylinders (15) thereof;

deploying the supporting gussets (18) for storing the assembly of trays (1) in the pit (6);

continuously lowering the lifting system (8) to each tray of the assembly of trays to pick up a next tray of the assembly of trays (1); withdrawing the supporting gussets (14) and allowing the lifting system (8) to rise up without interfering with a previously stored tray of the assembly of trays (1).

20. The system for reversibly converting stadiums into multifunctional infrastructures according to claim 1, wherein a tray joint closing mechanism (37) of each of the plurality of transport carriages (2) comprises a hydraulically actuated claw which in each of the plurality of transport carriages (2) is configured to drive a corresponding tray of the assembly of trays (1) closer, in a synchronized manner together with a remainder of the plurality of transport carriages (2), until closing the tray joint closing mechanism with a preceding tray of the assembly of trays.

21. The system for reversibly converting stadiums into multifunctional infrastructures according to claim 1, wherein the lifting system (43) comprises a drum (44), a cable (45), upper pulleys (46), lower pulleys (47), a supporting gusset (48), a runner (49), a bearing structure (50), and a guide (51).

22. The system for reversibly converting stadiums into multifunctional infrastructures according to claim 1, further comprising a liftable bleacher system (54), configured for raising up bleachers in sections to allow the assembly of trays (1) to be introduced in the storage system (7) of the pit (6), and for lowering the bleachers into the pit (6), the pit (6) configured to be covered and closed.

23. The system for reversibly converting stadiums into multifunctional infrastructures according to claim 1, further comprising a system of trap doors configured to allow the assembly of trays (1) to be introduced in the storage system (7) of the pit (6), when the pit (6) is built in an auxiliary area between the playing field and the folding bleachers and thus covering and enclosing the assembly of trays.

* * * * *